United States Patent
Wang et al.

(10) Patent No.: US 12,277,405 B1
(45) Date of Patent: Apr. 15, 2025

(54) DIVIDER, PROCESSOR, AND CALCULATION APPARATUS

(71) Applicant: SHENZHEN MICROBT ELECTRONICS TECHNOLOGY CO., LTD., Guangdong (CN)

(72) Inventors: Danyang Wang, Guangdong (CN); Yun Zhai, Guangdong (CN); Zhijun Fan, Guangdong (CN); Zuoxing Yang, Guangdong (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/857,330

(22) PCT Filed: Jun. 17, 2024

(86) PCT No.: PCT/CN2024/099491
§ 371 (c)(1),
(2) Date: Oct. 16, 2024

(87) PCT Pub. No.: WO2025/039692
PCT Pub. Date: Feb. 27, 2025

(30) Foreign Application Priority Data

Aug. 24, 2023 (CN) .......................... 202311072282.1

(51) Int. Cl.
*G06F 7/53* (2006.01)
*G06F 5/01* (2006.01)
*G06F 7/50* (2006.01)
*G06F 7/535* (2006.01)

(52) U.S. Cl.
CPC ................ *G06F 7/535* (2013.01); *G06F 5/01* (2013.01); *G06F 7/50* (2013.01)

(58) Field of Classification Search
CPC ............... G06F 7/535; G06F 5/01; G06F 7/50
USPC ........................................... 375/224; 708/190
See application file for complete search history.

(56) References Cited

U.S. PATENT DOCUMENTS

| | | | |
|---|---|---|---|
| 5,903,486 A | 5/1999 | Curtet | |
| 9,298,421 B2 * | 3/2016 | Ebergen | .................... G06F 7/64 |
| 2004/0230634 A1 | 11/2004 | Busaba et al. | |
| 2008/0065714 A1 * | 3/2008 | Fishcher | ................. G06F 7/722 |
| | | | 708/620 |
| 2011/0022646 A1 * | 1/2011 | Kitamura | ................ G06F 7/535 |
| | | | 708/211 |

(Continued)

FOREIGN PATENT DOCUMENTS

| | | |
|---|---|---|
| CN | 1149734 A | 5/1997 |
| CN | 102314331 A | 1/2012 |

(Continued)

*Primary Examiner* — Emmanuel Bayard
(74) *Attorney, Agent, or Firm* — Dickinson Wright PLLC

(57) ABSTRACT

This disclosure relates to a divider, a processor, and a calculation apparatus. The divider includes: a first-stage shift circuit, configured to shift a received first operand to left to generate a second operand; a first-stage selection circuit, configured to select a first preset multiple of a third operand as a fourth operand from preset multiples of the third operand; and a first-stage operational circuit, configured to calculate an OR operation result of the first preset multiple and a difference between the second operand and the fourth operand as a fifth operand.

20 Claims, 14 Drawing Sheets

(56) References Cited

U.S. PATENT DOCUMENTS

2016/0202952 A1\* 7/2016 Lundvall ............. G06F 9/30025
708/209
2017/0358333 A1\* 12/2017 Tiwari ................... G06F 12/02

FOREIGN PATENT DOCUMENTS

| | | |
|---|---|---|
| CN | 104375802 A | 2/2015 |
| CN | 105320491 A | 2/2016 |
| CN | 106708468 A | 5/2017 |
| CN | 111506293 A | 8/2020 |
| CN | 113391787 A | 9/2021 |
| CN | 115357216 A | 11/2022 |
| CN | 218068835 U | 12/2022 |
| CN | 116820388 A | 9/2023 |
| JP | H0695854 A | 4/1994 |
| JP | H0831026 B2 | 3/1996 |
| JP | H08263271 A | 10/1996 |
| JP | 2000010763 A | 1/2000 |
| TW | 201633139 A | 9/2016 |

\* cited by examiner

DIVIDER, PROCESSOR, AND CALCULATION APPARATUS

CROSS-REFERENCE TO RELATED APPLICATIONS

This application is a national stage of International Application No. PCT/CN2024/099491, filed on Jun. 17, 2024, which is based on and claims priority to Chinese Patent Application No. 202311072282.1, filed on Aug. 24, 2023. Both of the aforementioned applications are incorporated herein by reference in their entireties.

TECHNICAL FIELD

The present disclosure relates to the technical field of electronic circuit, and in particular, to a divider, a processor, and a calculation apparatus.

BACKGROUND

A divider is an apparatus for performing division, which can obtain a quotient and a remainder from a dividend and a divisor, and is widely used in a variety of operation processing. However, in the current cycle divider, as the bit numbers of the dividend and the divisor increase, the processing bit number of a corresponding component in the divider needs to be increased, and the number of the cycle operations need to be performed in the divider also increases, resulting in a rise in the apparatus complexity and the operation cost. Thus, there is a need to improve the divider.

SUMMARY

An objective of the present disclosure is to provide a divider, a processor, and a calculation apparatus.

According to a first aspect of the present disclosure, a divider is provided, the divider is configured to perform a division operation between a dividend and a divisor, comprising:
  at least one shift circuit comprising a first-stage shift circuit, wherein the first-stage shift circuit is configured to shift a received first operand to left to generate a second operand, and the first operand initially input into the divider is generated from the dividend;
  at least one selection circuit comprising a first-stage selection circuit, wherein the first-stage selection circuit is configured to select a first preset multiple of a third operand from preset multiples of the third operand, the first preset multiple of the third operand is as a fourth operand, the third operand is generated from the divisor, the second operand is greater than or equal to the first preset multiple of the third operand, the second operand is less than a second preset multiple of the third operand, and the second preset multiple is greater than the first preset multiple by one; and
  at least one operational circuit comprising a first-stage operational circuit, wherein a first input terminal of the first-stage operational circuit is connected to an output terminal of the first-stage shift circuit, a second input terminal of the first-stage operational circuit is connected to an output terminal of the first-stage selection circuit, and the first-stage operational circuit is configured to calculate an OR operation result of a difference and the first preset multiple, the difference is the difference from subtracting the fourth operand from the second operand, and the OR operation result is as a fifth operand.

In some embodiments, the at least one shift circuit further comprises a second-stage shift circuit, an input terminal of the second-stage shift circuit is connected to an output terminal of the first-stage operational circuit, and the second-stage shift circuit is configured to shift the received fifth operand to left to generate a sixth operand;
  the at least one selection circuit further comprises a second-stage selection circuit, the second-stage selection circuit is configured to select a third preset multiple of a seventh operand from preset multiples of the seventh operand, wherein the third preset multiple of the seventh operand is as an eighth operand, the seventh operand is generated from the divisor, the sixth operand is greater than or equal to the third preset multiple of the seventh operand, the sixth operand is less than a fourth preset multiple of the seventh operand, and the fourth preset multiple is greater than the third preset multiple by one; and
  the at least one operational circuit further comprises a second-stage operational circuit, a first input terminal of the second-stage operational circuit is connected to an output terminal of the second-stage shift circuit, a second input terminal of the second-stage operational circuit is connected to an output terminal of the second-stage selection circuit, and the second-stage operational circuit is configured to calculate an OR operation result of a difference and the third preset multiple, the difference is the difference subtracting the eighth operand from the sixth operand, and the OR operation result is as a ninth operand.

In some embodiments, a number of bits by which the second operand shifts to left relative to the first operand is equal to a number of bits by which the sixth operand shifts to left relative to the fifth operand;
  the third operand is equal to the seventh operand; and
  the preset multiples of the third operand received by the first-stage selection circuit are respectively equal to the corresponding preset multiples of the seventh operand received by the second-stage selection circuit.

In some embodiments, an output terminal of a last-stage operational circuit of the at least one operational circuit is connected to an input terminal of an initial-stage shift circuit of the at least one shift circuit, and the last-stage operational circuit is configured to return its calculated OR operation result as an updated operand to the initial-stage shift circuit, so as to enter a next cycle operation in the divider.

In some embodiments, the selection circuit comprises a multiplexer, the multiplexer comprises a plurality of input terminals, a control terminal, and an output terminal, and the multiplexer is configured to select, in an effect of a control signal at the control terminal, one operand from a plurality of operands input from the plurality of input terminals, to be output through the output terminal.

In some embodiments, the selection circuit comprises a plurality of AND operation units and one OR operation unit, the plurality of AND operation units are disposed in parallel, an output terminal of each AND operation unit is connected to an input terminal of the OR operation unit, two input terminals of each of the plurality of AND operation units are respectively configured to receive a corresponding operand and a control signal, and the OR operation unit is configured to perform an OR operation among a plurality of AND operation results of the operands and the control signals from the plurality of AND operation units, and to output an OR operation result.

In some embodiments, the operational circuit comprises:
a first adder-subtractor, wherein the first adder-subtractor is configured to calculate a difference between a higher preset bit portion of an operand as a minuend and a corresponding higher preset bit portion of an operand as a subtrahend;
a plurality of concatenators, wherein an input terminal of each of the plurality of concatenators is connected to an output terminal of the first adder-subtractor, and the concatenator is configured to generate a concatenated operand according to the difference from the first adder-subtractor and a corresponding preset multiple, wherein a high-bit portion of the concatenated operand is the difference, a low-bit portion of the concatenated operand is the corresponding preset multiple, and a middle-bit portion of the concatenated operand is a corresponding middle-bit portion of the minuend; and
a first selector, wherein input terminals of the first selector are connected to an output terminal of a corresponding shift circuit and an output terminal of each of the plurality of concatenators, and the first selector is configured to select a corresponding operand from operands that are from the shift circuit and the concatenators.

In some embodiments, the operational circuit comprises:
a first adder-subtractor, wherein the first adder-subtractor is configured to calculate a difference between a higher preset bit portion of an operand as a minuend and a corresponding higher preset bit portion of an operand as a subtrahend;
a plurality of OR gates, wherein an input terminal of each of the plurality of OR gates is connected to an output terminal of the first adder-subtractor, and the OR gate is configured to calculate an OR operation result of between the difference from the first adder-subtractor and a corresponding preset multiple; and
a first selector, wherein input terminals of the first selector are connected to an output terminal of a corresponding shift circuit and an output terminal of each of the plurality of OR gates, and the first selector is configured to select a corresponding operand from an operand that is from the shift circuit and OR operation results that are from the OR gates.

In some embodiments, the divider further comprises a preprocessing circuit, wherein the preprocessing circuit comprises at least one of:
a first register, wherein an output terminal of the first register is connected to an input terminal of an initial-stage shift circuit of the at least one shift circuit, and the first register is configured to temporarily store an operand to be input into the initial-stage shift circuit;
a second selector, wherein an output terminal of the second selector is connected to an input terminal of the first register, and the second selector is configured to select an operand to enter a next cycle operation from the operand generated from the dividend and an operand returned by a last-stage operational circuit of the at least one operational circuit;
a second register, wherein an output terminal of the second register is at least connected to one input terminal of one selection circuit, and the second register is configured to temporarily store an operand to be input into the selection circuit;

one or more multiple calculation circuits, wherein each of the one or more multiple calculation circuits is respectively configured to calculate a corresponding preset multiple of an operand; or
one or more third registers, wherein an input terminal of each of the one or more third registers is connected to an output terminal of a corresponding multiple calculation circuit, an output terminal of each third register is at least connected to a corresponding input terminal of one selection circuit respectively, and the third register is configured to temporarily store the corresponding preset multiple of the operand to be input into the selection circuit.

In some embodiments, the multiple calculation circuit comprises an even multiple calculation circuit, the even multiple calculation circuit comprises a first shifter, the first shifter in is configured to shift an intermediate operand to left by one bit to generate an even multiple of an initial operand, wherein the intermediate operand is an integer multiple of the initial operand.

In some embodiments, the multiple calculation circuit comprises an odd multiple calculation circuit, the odd multiple calculation circuit comprises a second shifter and a second adder-subtractor, the second shifter is configured to shift an intermediate operand to left by one bit to generate two multiple of the intermediate operand, the second adder-subtractor is configured to add two multiple of the intermediate operand and an initial operand to generate an odd multiple of the initial operand, wherein the intermediate operand is an integer multiple of the initial operand.

In some embodiments, the multiple calculation circuit comprises an odd multiple calculation circuit, and the odd multiple calculation circuit comprises:
a second adder-subtractor, wherein the second adder-subtractor is a same adder-subtractor as a first adder-subtractor in one of the at least one operational circuit, and an output terminal of the first adder-subtractor is connected to an input terminal of a corresponding third register;
a third selector, wherein a first input terminal of the third selector is configured to receive two multiple of an intermediate operand, a second input terminal of the third selector is connected to an output terminal of one shift circuit that is at a same stage as the operational circuit, an output terminal of the third selector is connected to a first input terminal of the first adder-subtractor, and the intermediate operand is an integer multiple of an initial operand; and
a fourth selector, wherein a first input terminal of the fourth selector is connected to an output terminal of one selection circuit that is at the same stage as the operational circuit, a second input terminal of the fourth selector is configured to receive the initial operand, and an output terminal of the fourth selector is connected to a second input terminal of the first adder-subtractor;
wherein in a case of calculating a preset multiple of the initial operand, the third selector is configured to select two multiple of the intermediate operand, the fourth selector is configured to select the initial operand, and the preset multiple of the initial operand output by the first adder-subtractor is returned to the third register; and in a case of performing a division operation in the divider, the third selector is configured to select an operand output by the shift circuit, and the fourth selector is configured to select an operand output by the selection circuit.

In some embodiments, the divider further comprises:
a counter configured to record a number of cycle operations in the divider.

In some embodiments, the dividend has a first preset bit number B1, the divisor has a third preset bit number B3, the first operand initially input into the divider is generated by adding B3 zeros to the dividend on a high-bit side of the dividend, and the third operand is generated by adding B1 zeros to the divisor on a low-bit side of the divisor.

In some embodiments, in a case in which a remaining bit number Br and a second preset bit number B2 satisfy Br≥B2, the second operand is generated by shifting the first operand to left by the second preset bit number B2 of bits; or
in a case in which the remaining bit number Br and the second preset bit number B2 satisfy Br<B2, the second operand is generated by shifting the first operand to left by the remaining bit number Br of bits,
wherein the remaining bit number Br satisfies that Br=B3−N*B0, B0 is a total number of bits shifting to left by the at least one shift circuit in the non-last cycle operation of the divider, N is a number of cycles already performed in the divider, Br≥1, and B2>1.

In some embodiments, the divider is configured to perform a last cycle operation in a case in which Br≤B2.

In some embodiments, the preset multiples of the third operand comprise all integer multiples of the third operand in a range from one multiple of the third operand to M0 multiple of the third operand, wherein in a case in which Br≥B2, M0=$2^{B2}-1$, or in a case in which Br<B2, M0=$2^{Br}-1$.

According to a second aspect of the present disclosure, a processor is provided, the processor comprises the divider described above.

In some embodiments, the processor comprises at least one of a neural-network processor, a central processor, a coprocessor, a digital signal processor, or a dedicated instruction processor.

According to a third aspect of the present disclosure, a calculation apparatus is provided, the calculation apparatus comprises the divider described above or the processor described above.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings that constitute a part of the specification depict embodiments of the present disclosure, and are used to explain the principle of the present disclosure together with the specification.

With reference to the accompanying drawings, the present disclosure can be understood more clearly according to the following detailed descriptions, wherein.

It is to be noted that in the embodiments illustrated below, sometimes the same reference signs are jointly used across different accompanying drawings to represent the same parts or parts with the same function, and repeated descriptions thereof are omitted. In the specification, similar numbers and letters are used to represent similar items. Therefore, once a certain item is defined in an accompanying drawing, it does not need to be further discussed in subsequent accompanying drawings.

For ease of understanding, locations, sizes, scopes, and the like of structures shown in the accompanying drawings or the like sometimes do not represent practical locations, sizes, scopes, and the like. Therefore, the disclosed invention is not limited to the locations, the sizes, the scopes, and the like disclosed in the accompanying drawings or the like. Moreover, the accompanying drawings are not necessarily drawn to scale, and some features may be enlarged to show details of specific components.

DETAILED DESCRIPTION

Various exemplary embodiments of the present disclosure are described in detail with reference to the accompanying drawings below. It is to be noted that, unless otherwise illustrated specifically, relative arrangement of components and steps, numerical expressions, and values stated in these embodiments do not limit the scope of the present disclosure.

Practically, the following descriptions of at least one exemplary embodiment are merely illustrative, and in no way constitute any limitation on the present disclosure and the application or use thereof. In other words, the structure and the method herein are shown in an exemplary manner to illustrate different embodiments of the structure and the method in the present disclosure. However, a person skilled in the art will understand that they merely illustrate exemplary rather than exhaustive manners in which the present disclosure may be implemented. Moreover, the accompanying drawings are not necessarily drawn to scale, and some features may be enlarged to show details of specific components.

In addition, a technology, a method, and a device known to a person of ordinary skill in the related art may not be discussed in detail, but in proper circumstances, said technology, method, and device shall be regarded as a part of the specification.

In all examples that are shown and discussed herein, any specific value should be interpreted only as an example but not as a limitation. Therefore, there may be different values in other examples of the exemplary embodiments.

Figure 1:
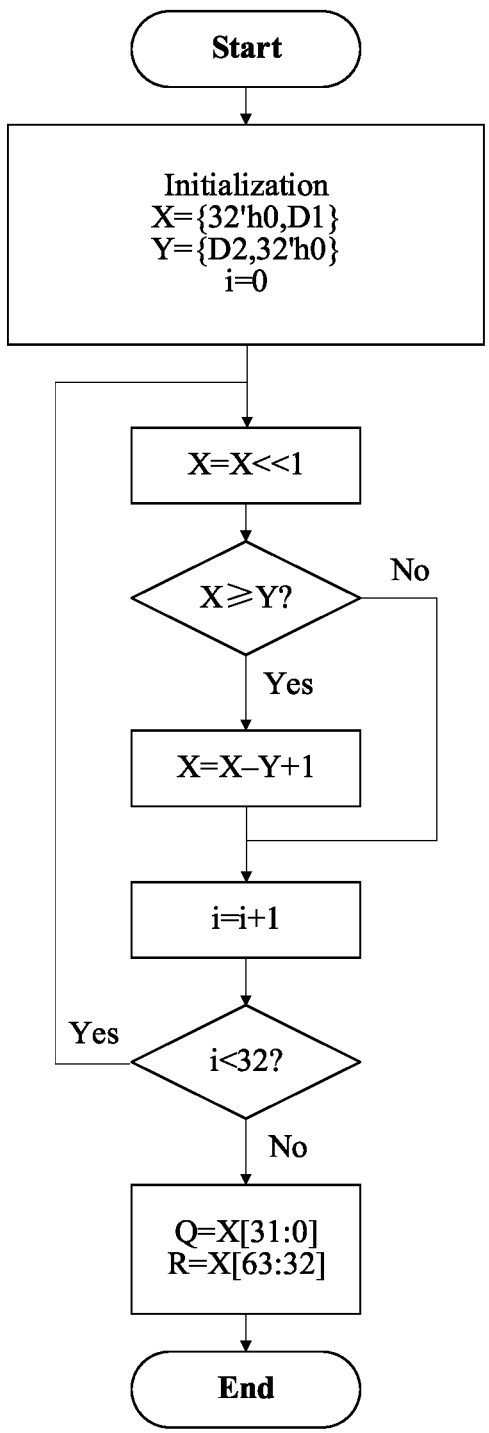
FIG. 1 shows a schematic diagram of a division operation flow.

The cycle divider may operate based on the division operation flow shown in FIG. 1, to obtain the quotient Q and the remainder R from dividing the dividend D1 by the divisor D2. The following specifically describes the structure and the operation flow of the divider by taking an example in which the bit number of the dividend D1 and the bit number of the divisor D2 are each 32. However, it may be understood that the dividend D1 and the divisor D2 may alternatively have other bit numbers, and their bit numbers may be the same or different. For example, in a case in which the dividend D1 includes m bits and the divisor D2 includes n bits, n (i.e., the bit number of the divisor D2) zeros may be added on the high-bit side (left side) of the m-bit dividend D1, to generate the operand X={n'h0,D1}, and m (i.e., the bit number of the dividend D1) zeros may be added on the low-bit side (right side) of the n-bit divisor D2, to generate the operand Y={D2,m'h0}, for continuing the division operation. Alternatively, in a case in which the bit numbers of the dividend and the divisor are different, the dividend and the divisor may be converted to have the same bit number by the conversion circuit or the like, so as to continue the calculation.

As shown in FIG. 1, after the dividend D1 and the divisor D2 are obtained, in order to facilitate shifting the dividend D1 and comparing between the operands in the subsequent operation process, the dividend D1 and the divisor D2 may be initialized or preprocessed first. In FIG. 1, 32 zeros may be added on the high-bit side (left side) of the 32-bit dividend D1, to generate the operand X={32'h0,D1}, and 32 zeros may be added on the low-bit side (right side) of the 32-bit divisor D2, to generate the operand Y={D2,32'h0}. In addition, the cycle count i may be initialized as i=0. The cycle count i may be used to record the number of the cycle operations performed in the cycle divider, so as to break out of the cycle in a case in which the preset cycle count is reached, and to obtain the correct quotient Q and remainder R. In each cycle of the cycle divider, the operand X may be shifted to left by one bit, X is reassigned with X<<1 (i.e., X=X<<1); then the updated X and Y are compared; in a case in which X≥Y, X is reassigned as X=X−Y+1, while in a case in which X<Y, X remains unchanged. Besides, the cycle count i may be incremented by 1, to record the present cycle. Further, the cycle count i and the preset cycle count (in the specific example of FIG. 1, the preset cycle count is 32) are compared; in a case in which i<32, the current X is returned to enter the next cycle for operation, while in a case in which i≥32, breaking out of the cycle and the current X is output, wherein the lower 32 bits of the output X represent the quotient Q from dividing the dividend D1 by the divisor D2, that is, Q=X [31:0], and the higher 32 bits of the output X represent the remainder R from dividing the dividend D1 by the divisor D2, that is, R=X [63:32]. In addition, for a more general case, that is, in a case in which the dividend D1 includes m bits and the divisor D2 includes n bits, as described above, n (i.e., the bit number of the divisor D2) zeros may be added on the high-bit side (left side) of the m-bit dividend D1, to generate the operand X={n'h0,D1}, and m (i.e., the bit number of the dividend D1) zeros may be added on the low-bit side (right side) of the n-bit divisor D2, to generate the operand Y={D2,m'h0}, in this case, the preset cycle count is m, that is, after m cycles are performed according to the cycling algorithm described above, or in other words, in a case in which i≥m, breaking out of the cycle and the current X is output, wherein the lower m bits of the output X represent the quotient Q from dividing the dividend D1 by the divisor D2, that is, Q=X [m−1:0], and the higher n bits of the output X represent the remainder R from dividing the dividend D1 by the divisor D2, that is, R=X [m+n−1:m].

Figure 2:
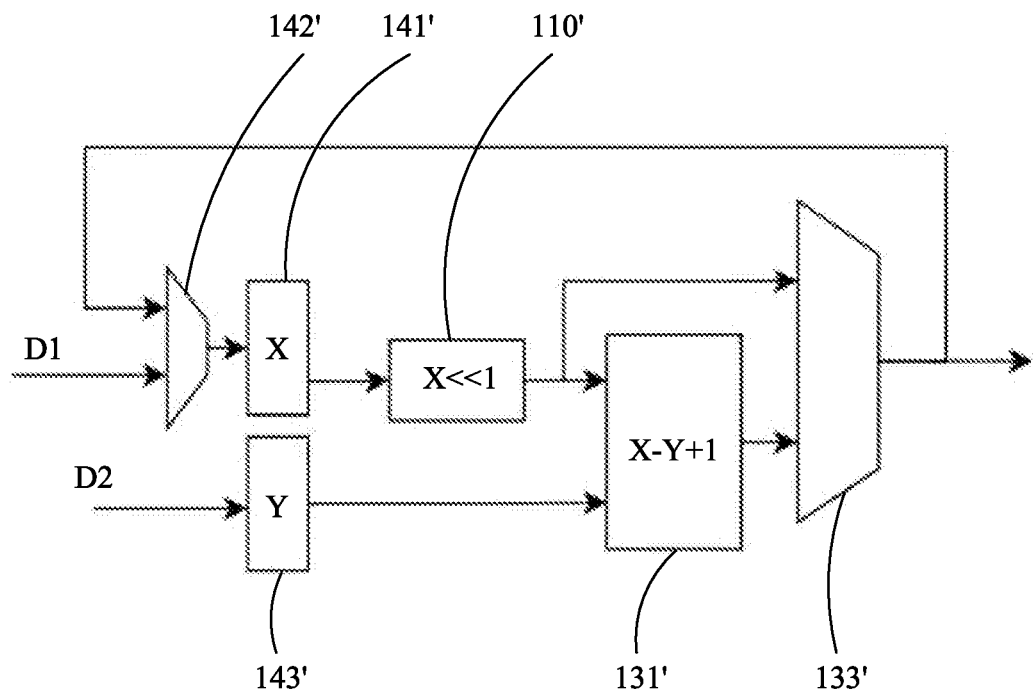
FIG. 2 shows a circuit structural schematic diagram of a divider for implementing the division operation flow in FIG. 1.

FIG. 2 shows a circuit structural schematic diagram of a divider for implementing the division operation flow shown in FIG. 1. The divider may include the input selector 142', the registers 141' and 143', the shifter 110', the adder-subtractor 131', and the output selector 133'. One input terminal of the input selector 142' may be used to receive the dividend D1, and the other input terminal of the input selector 142' is connected to the output terminal of the output selector 133' to receive the returned operand. The register 141' is connected between the output terminal of the input selector 142' and the input terminal of the shifter 110'. The register 143' may be used to receive the divisor D2, and the output terminal of the register 143' is connected to one input terminal of the adder-subtractor 131'. The output terminal of the shifter 110' is connected to the other input terminal of the adder-subtractor 131', and the output terminal of the shifter 110' is also connected to one input terminal of the output selector 133'. The output terminal of the adder-subtractor 131' is connected to the other input terminal of the output selector 133'.

In the first cycle operation of the divider, the input selector 142' selects the dividend D1. The register 141' may temporarily store the operand X generated from the dividend D1, while the register 143' may temporarily store the operand Y generated from the divisor D2. The operand X is shifted to left by one bit by the shifter 110', and the shifted X is input into the adder-subtractor 131' and the output selector 133'. In addition, the operand Y is also input into the adder-subtractor 131'. As such, the adder-subtractor 131' may calculate the value of X−Y+1. In a case in which X≥Y, the output selector 133' selects X−Y+1 as the updated X and returns the updated X to the input selector 142', while in a case in which X<Y, the output selector 133' selects X that is directly from the shifter 110' and returns X to the input selector 142'. In the non-first cycle operation of the divider, the input selector 142' selects X returned by the output selector 133', so as to enter the next cycle. In a case in which the preset cycle count is reached, breaking out of the cycle, and the output selector 133' may output the current X, wherein the lower 32 bits of the current X represent the quotient Q from dividing the dividend D1 by the divisor D2, and the higher 32 bits of the current X represent the remainder R from dividing the dividend D1 by the divisor D2.

In the cycle divider shown in FIG. 2, the number of cycles is equal to the bit number of the dividend or the divisor. Thus, as the bit number of the dividend or the divisor increases, the number of cycles increases accordingly, resulting in an increase in the calculation delay and a decrease in the calculation efficiency. In addition, because bits are added to the dividend and the divisor during initialization, and the value of X−Y+1 needs to be calculated during the operation process, the adder-subtractor with the bit number equal to that of the resulting operand after the bit addition needs to be disposed in the divider (in the specific example of FIG. 2, the adder-subtractor 131' is the 64-bit adder-subtractor), which results that the circuit structure of the divider becomes complex, the chip area occupied increases, and the apparatus cost increases accordingly.

Figure 3:
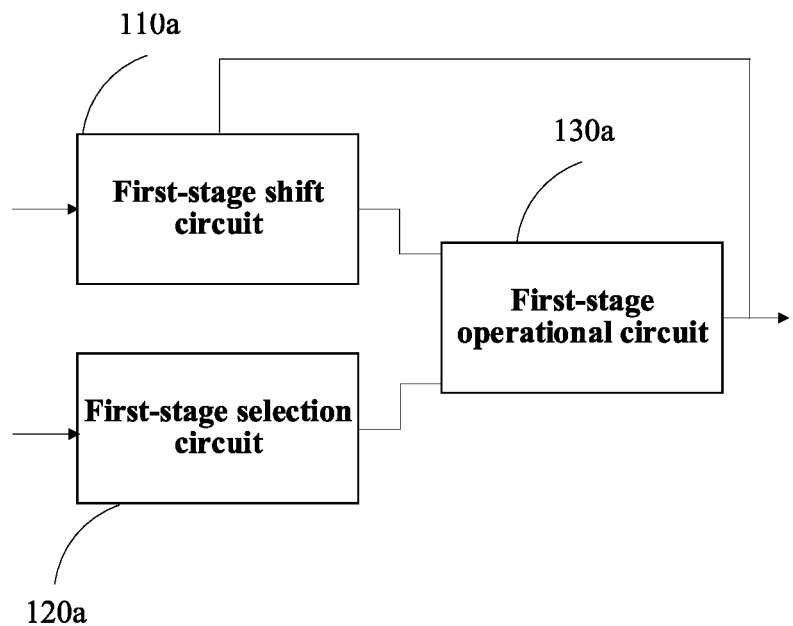
FIG. 3 shows a circuit structural schematic diagram of a divider according to an exemplary embodiment of the present disclosure.

To resolve at least one of the problems described above, the present disclosure provides a divider. In an exemplary embodiment of the present disclosure, as shown in FIG. 3, the divider may include at least one shift circuit, at least one selection circuit, and at least one operational circuit. The divider may be used for implementing the division operation flow shown in FIG. 4.

Figure 4:
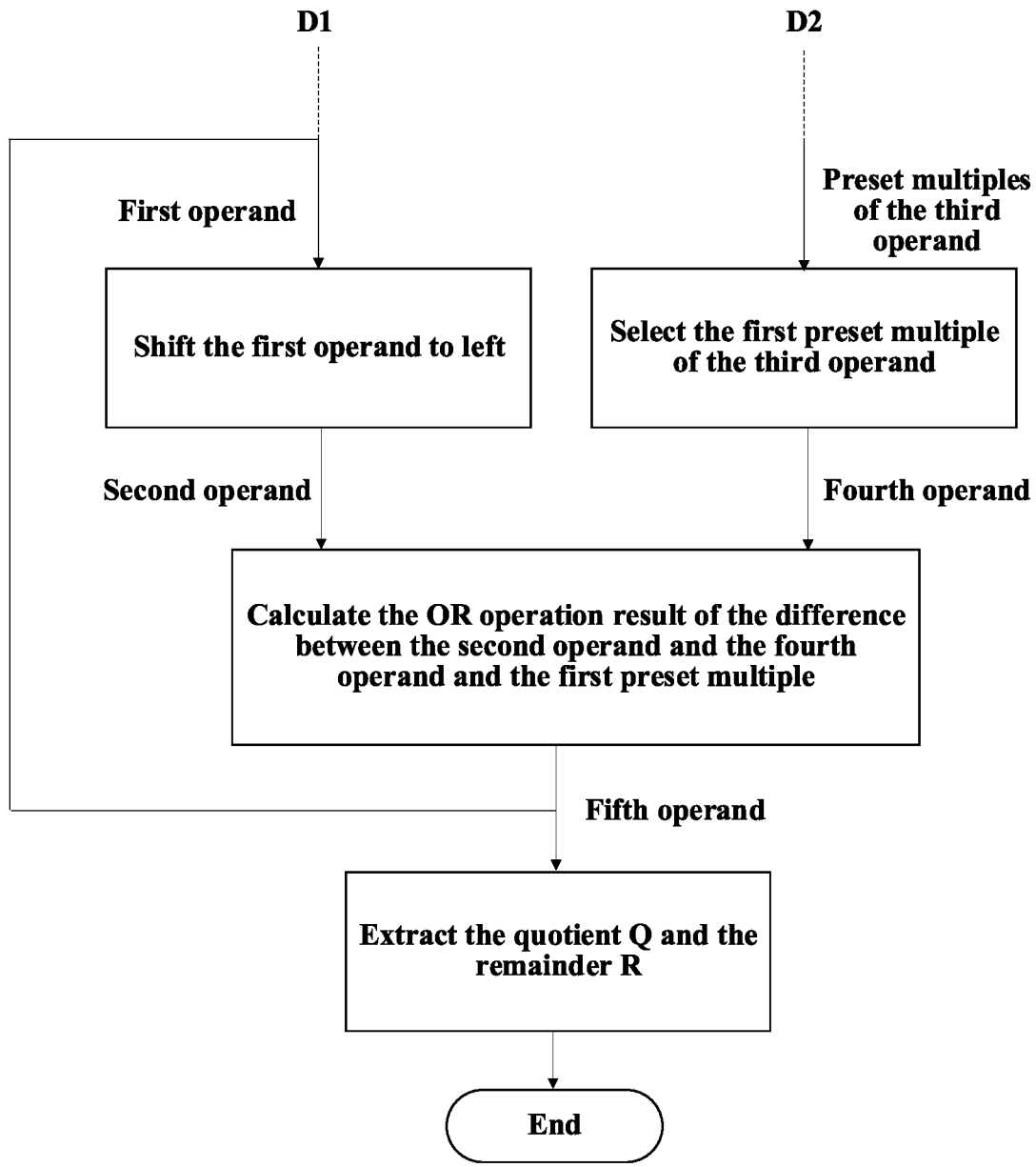
FIG. 4 shows a schematic diagram of a division operation flow in the divider of FIG. 3.

As shown in FIGS. 3 and 4, the at least one shift circuit may include the first-stage shift circuit 110a, and the first-stage shift circuit 110a may be configured to shift the received first operand to left to generate the second operand. Herein, the first operand initially input into the divider may be generated from the dividend. For example, the first operand may be generated by adding bits to the dividend, wherein the number of bits added may be equal to the bit number of the divisor; alternatively, the first operand may be the operand output by the previous-stage operational circuit or returned by the last-stage operational circuit, for continuing the division operation. In a specific example, assuming that the dividend has the first preset bit number B1 and the divisor has the third preset bit number B3, then the first operand initially input into the divider may be generated by adding B3 zeros to the dividend on the high-bit side of the dividend, that is, the bit number of the first operand is B1+B3. In a specific example, in a case in which the first preset bit number B1 and the third preset bit number B3 are equal, the bit number of the first operand is 2B1. In a case in which the remaining bit number Br and the second preset bit number B2 satisfy Br≥B2, the second operand may be generated by shifting the first operand to left by B2 (the second preset bit number) bits; while in a case in which the remaining bit number Br and the second preset bit number B2 satisfy Br<B2, the second operand may be generated by shifting the first operand to left by Br (the remaining bit number) bits. Herein, the remaining bit number Br satisfies that Br=B3−N*B0, wherein B0 is a total number of bits shifting to left by all the shift circuits in the divider in the non-last cycle operation of the divider (in a case in which the divider includes only one shift circuit, B0 is the number of bits shifting to left by the first-stage shift circuit 110a in the non-last cycle operation), and N is the number of cycles that have been performed in the divider. In order to reduce the number of cycle operations that need to be performed in the divider, the second preset bit number B2 may be greater than 1, that is, at least in the non-last cycle operation, the first-stage shift circuit 110a shifts the first operand to left by two or more bits, to help reduce the operation time and improve the operation efficiency. In addition, in order to ensure the correctness of the division operation, the remaining bit number Br may satisfy that Br≥1. The divider may be configured to perform the last cycle operation in a case in which Br≤B2. In other words, when a total number of bits by which the first operand initially generated from the dividend shifted to left in the divider is equal to the number of bits added to the dividend, the divider stops cycling, in this case, the lower B1 bit portion of the operand output by the corresponding operational circuit (which is the first-stage operational circuit 130a in FIG. 3) represents the quotient, and the higher B3 bit portion represents the remainder.

As shown in FIGS. 3 and 4, the at least one selection circuit may include the first-stage selection circuit 120a, and the first-stage selection circuit 120a may be configured to select the first preset multiple of the third operand as the fourth operand from preset multiples of the third operand (FIG. 3 shows only one input terminal of the first-stage selection circuit 120a, however, it may be understood that the first-stage selection circuit 120a may include a plurality of input terminals to respectively receive respective preset multiples of the third operand for selection). Herein, the third operand may be generated from the divisor. For example, the third operand may be generated by adding bits to the divisor, wherein the number of bits added may be equal to the bit number of the dividend. In a specific example, when the dividend has the first preset bit number B1, the third operand may be generated by adding B1 zeros to the divisor on the low-bit side of the divisor. The preset multiples of the third operand input into the first-stage selection circuit 120a may include all the integer multiples of the third operand in a range from one multiple of the third operand to M0 multiple of the third operand, wherein in a case in which Br≥B2, M0=$2^{B2}$−1, and in a case in which Br<B2, M0=$2^{Br}$−1. It can be seen that the first-stage selection circuit 120a may have (2B2−1) input terminals, which are sufficient to receive the corresponding preset multiples of the third operand in any case. Further, the selected first preset multiple of the third operand may meet the following conditions: the second operand is greater than or equal to the first preset multiple of the third operand, and the second operand is less than the second preset multiple of the third operand, wherein the second preset multiple is greater than the first preset multiple by 1.

As shown in FIGS. 3 and 4, the at least one operational circuit may include the first-stage operational circuit 130a, and the first input terminal of the first-stage operational circuit 130a is connected to the output terminal of the first-stage shift circuit 110a, and the second input terminal of the first-stage operational circuit 130a is connected to the output terminal of the first-stage selection circuit 120a. The first-stage operational circuit 130a may be configured to calculate the OR operation result of the first preset multiple and the difference from subtracting the fourth operand from the second operand, wherein the OR operation result is taken as the fifth operand. Depending on the circulation condition in the divider, the fifth operand may be input into the next-stage shift circuit or be returned to the initial-stage shift circuit for subsequent operation; alternatively, the quotient and the remainder from dividing the dividend by the divisor may be extracted according to the output fifth operand.

Figure 5:
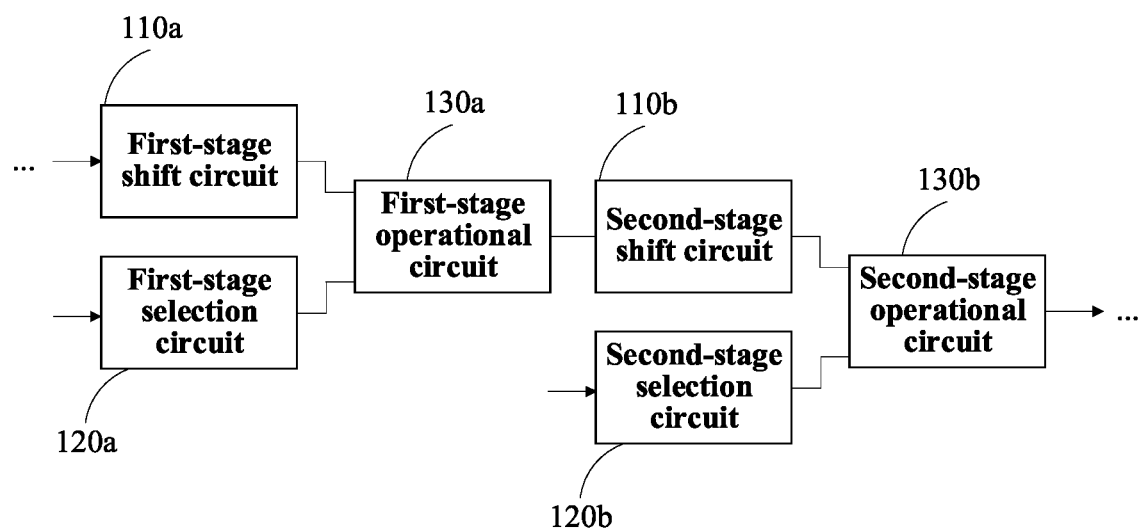
FIG. 5 shows a circuit structural schematic diagram of at least part of a divider according to another exemplary embodiment of the present disclosure.
Figure 6:
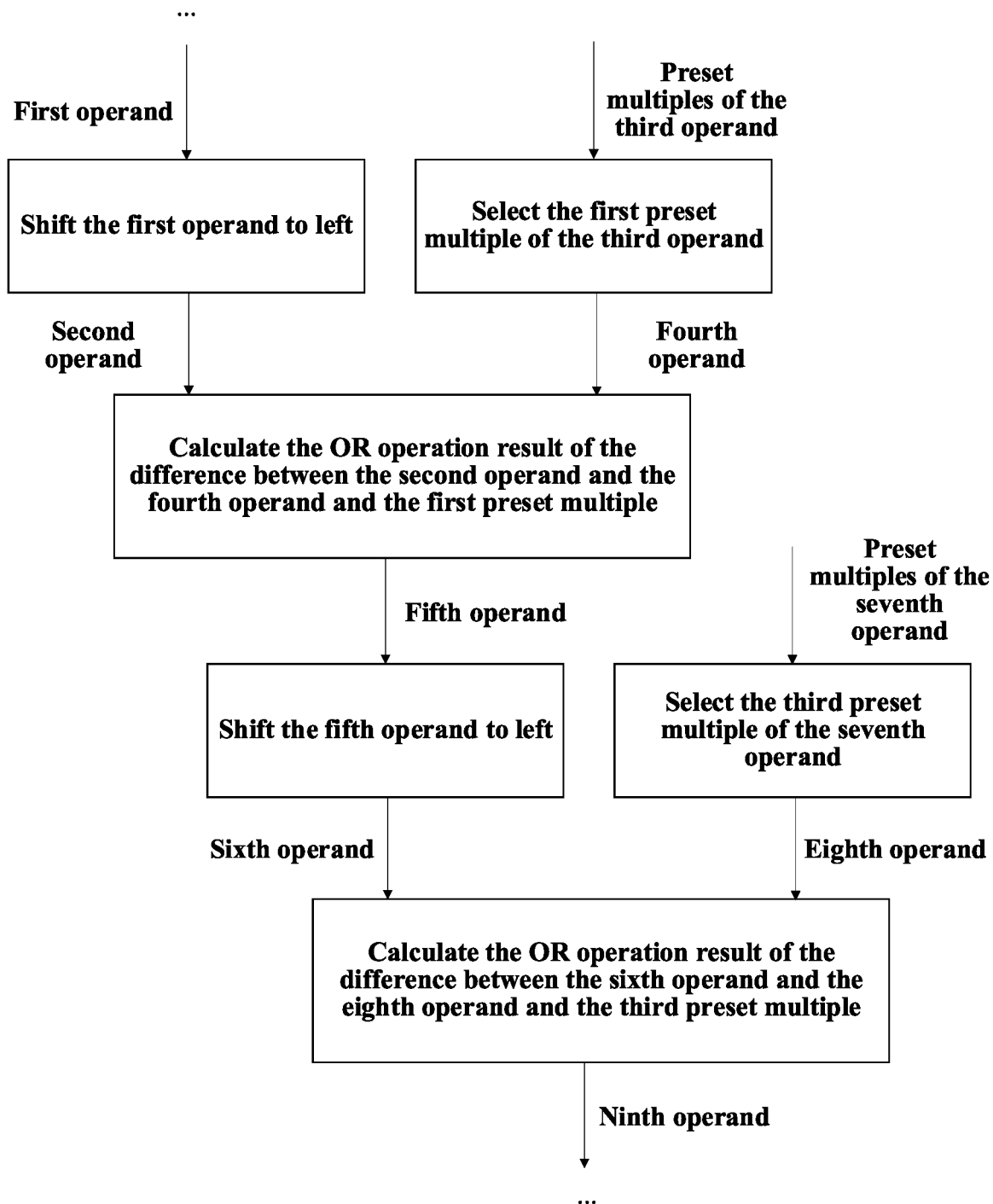
FIG. 6 shows a schematic diagram of part of a division operation flow in the divider of FIG. 5.

In another exemplary embodiment of the present disclosure, as shown in FIGS. 5 and 6, the divider may further include the second-stage shift circuit 110b, the second-stage selection circuit 120b, and the second-stage operational circuit 130b, further increasing the number of bits shifting to left in each cycle operation, and reducing the number of cycle operations.

As shown in FIGS. 5 and 6, the input terminal of the second-stage shift circuit 110b may be connected to the output terminal of the first-stage operational circuit 130a. The second-stage shift circuit 110b may be configured to shift the received fifth operand to left to generate the sixth operand. In some embodiments, the number of bits by which the sixth operand shifted to left relative to the fifth operand may be equal to the number of bits by which the second operand shifted to left relative to the first operand. As such, the first-stage shift circuit 110a and the second-stage shift circuit 110b may have the same or similar structures, thereby simplifying the design of the divider circuit. However, it may be understood that in some other embodiments, as required, the number of bits by which the sixth operand shifted to left relative to the fifth operand may be not equal to the number of bits by which the second operand shifted to left relative to the first operand, which is not limited herein.

As shown in FIGS. 5 and 6, the second-stage selection circuit 120b may be configured to select the third preset multiple of the seventh operand as the eighth operand from preset multiples of the seventh operand (FIG. 5 shows only one input terminal of the second-stage selection circuit 120b, however, it may be understood that the second-stage selection circuit 120b may include a plurality of input terminals, to respectively receive the corresponding preset multiples of the seventh operand). Herein, the seventh operand may also be generated from the divisor. For example, the seventh operand may be generated by adding bits to the divisor. In some embodiments, the seventh operand may be equal to the third operand. For example, in a case in which the dividend has the first preset bit number B1, the seventh operand may be generated by adding B1 zeros to the divisor on the low-bit side of the divisor. In a case in which the number of bits by which the sixth operand shifted to left relative to the fifth operand is equal to the number of bits by which the second operand shifted to left relative to the first operand, the preset multiples of the seventh operand received by the second-stage selection circuit 120b may be respectively equal to the corresponding preset multiples of the third operand received by the first-stage selection circuit 120a. As such, the second-stage selection circuit 120b and the first-stage selection circuit 120a may have the same or similar circuit structures, thereby simplifying the circuit design of the divider. However, it may be understood that in some other embodiments, in the non-last cycle operation, the preset multiples of the seventh operand input into the second-stage selection circuit 120b may include all the integer multiples of the seventh operand in a range from one multiple of the seventh operand to M0' multiple of the seventh operand, wherein $M0'=2^{B2'}-1$, and B2' is the number of bits by which the operand shifted to left by the second-stage shift circuit 110b in the non-last cycle operation, and B2' may be not equal to the number of bits B2 by which the operand shifted to left by the first-stage shift circuit 110a in the non-last cycle operation. Likewise, the selected third preset multiple of the seventh operand meets the following conditions: the sixth operand is greater than or equal to the third preset multiple of the seventh operand, and the sixth operand is less than the fourth preset multiple of the seventh operand, wherein the fourth preset multiple is greater than the third preset multiple by 1.

As shown in FIGS. 5 and 6, the first input terminal of the second-stage operational circuit 130b is connected to the output terminal of the second-stage shift circuit 110b, and the second input terminal of the second-stage operational circuit 130b is connected to the output terminal of the second-stage selection circuit 120b. The second-stage operational circuit 130b may be configured to calculate the OR operation result of the third preset multiple and the difference from subtracting the eighth operand from the sixth operand, wherein the OR operation result is taken as the ninth operand. Depending on the circulation condition in the divider, the ninth operand may be input into the next-stage shift circuit or be returned to the initial-stage shift circuit for subsequent operation; alternatively, the quotient and the remainder may be extracted according to the ninth operand. Likewise, in some embodiments, the second-stage operational circuit 130b and the first-stage operational circuit 130a may have the same or similar circuit structures, thereby simplifying the circuit design of the divider.

It may be understood that the divider of the present disclosure may further include more stages of shift circuits, selection circuits, and operational circuits, thereby further increasing the number of bits shiftable in each cycle operation, and reducing the number of cycle operations that need to be performed in the divider. The connection manner between two adjacent stages of circuits is similar to that between the first-stage circuit and the second-stage circuit shown in FIG. 5. In other words, in any two adjacent stages of circuits, the previous stage of shift circuit may be regarded as the first-stage shift circuit, the latter stage of shift circuit may be regarded as the second-stage shift circuit, the previous stage of selection circuit may be regarded as the first-stage selection circuit, the latter stage of selection circuit may be regarded as the second-stage selection circuit, the previous stage of operational circuit may be regarded as the first-stage operational circuit, and the latter stage of operational circuit may be regarded as the second-stage operational circuit, and the circuits may be connected with reference to the manner shown in FIG. 5, which will not be described herein again.

Figure 7:
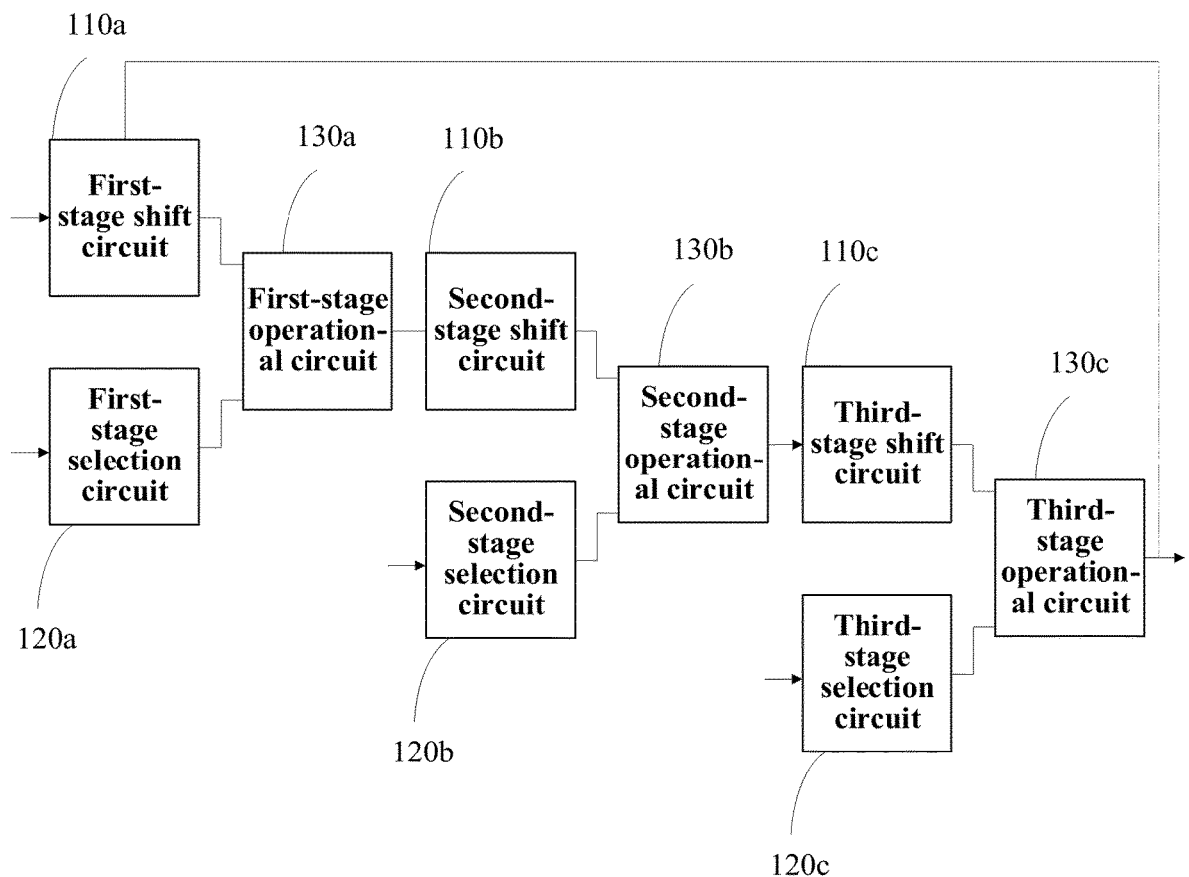
FIG. 7 shows a circuit structural schematic diagram of a divider according to a specific example of the present disclosure.

In some embodiments, the output terminal of the last-stage operational circuit of the operational circuits in the divider may be connected to the input terminal of the initial-stage shift circuit of the shift circuits, and the last-stage operational circuit may be configured to return its calculated OR operation result as the updated operand to the initial-stage shift circuit, so as to enter the next cycle operation of the divider. For example, in the specific example shown in FIG. 3, the divider includes a total of one stage of circuit, thus the output terminal of the first-stage operational circuit 130a (the last-stage operational circuit) may be connected to the input terminal of the first-stage shift circuit 110a (the initial-stage shift circuit), so as to return the corresponding operand. In the specific example shown in FIG. 7, the divider includes a total of three stages of circuits, thus the output terminal of the third-stage operational circuit 130c (the last-stage operational circuit) may be connected to the input terminal of the first-stage shift circuit 110a (the initial-stage shift circuit), so as to return the corresponding operand. In addition, in general, when breaking out of the cycle in a case in which the preset cycle count is reached, the quotient and the remainder may be extracted according to the OR operation result output by the last-stage operational circuit in the divider. However, in some other cases, especially when the divider includes many stages of circuits, it is possible that a total number of bits by which the operand generated from the dividend shifted has reached the number of bits added to the dividend at a certain shift circuit before the last-stage shift circuit in the last cycle operation, in this case, the correct quotient and remainder may be extracted according to the OR operation result generated by the operational circuit that is at the same stage as the non-last-stage shift circuit, as such, the last-stage shift circuit may not perform any operation. In addition, it may be understood that in a case in which the divider includes enough stages of circuits, the correct quotient and remainder may be obtained in the first cycle operation, with no need to return the OR operation result generated by the last-stage operational circuit to the initial-stage shift circuit to enter the next cycle operation, that is, the preset cycle count in this case may be 1.

The following exemplarily describes the specific structures of the circuits and the corresponding division operation flows in the dividers based on several specific embodiments.

Figure 8:
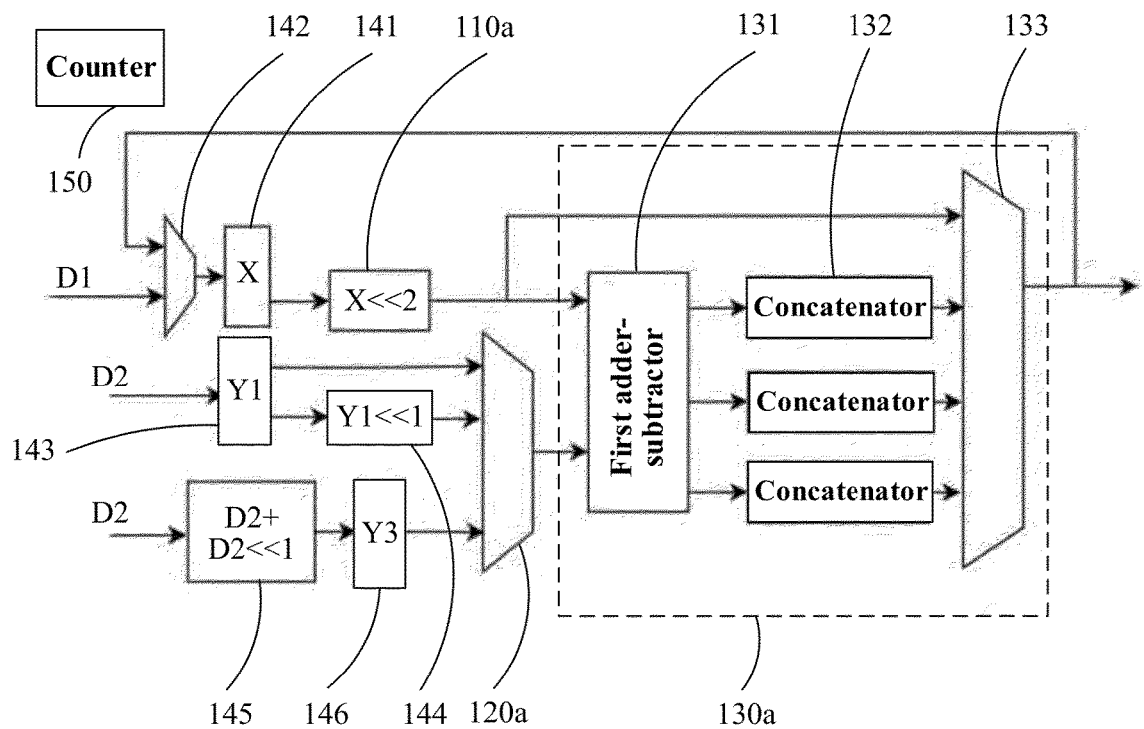
FIG. 8 shows a circuit structural schematic diagram of a divider in a first specific embodiment of the present disclosure.
Figure 9:
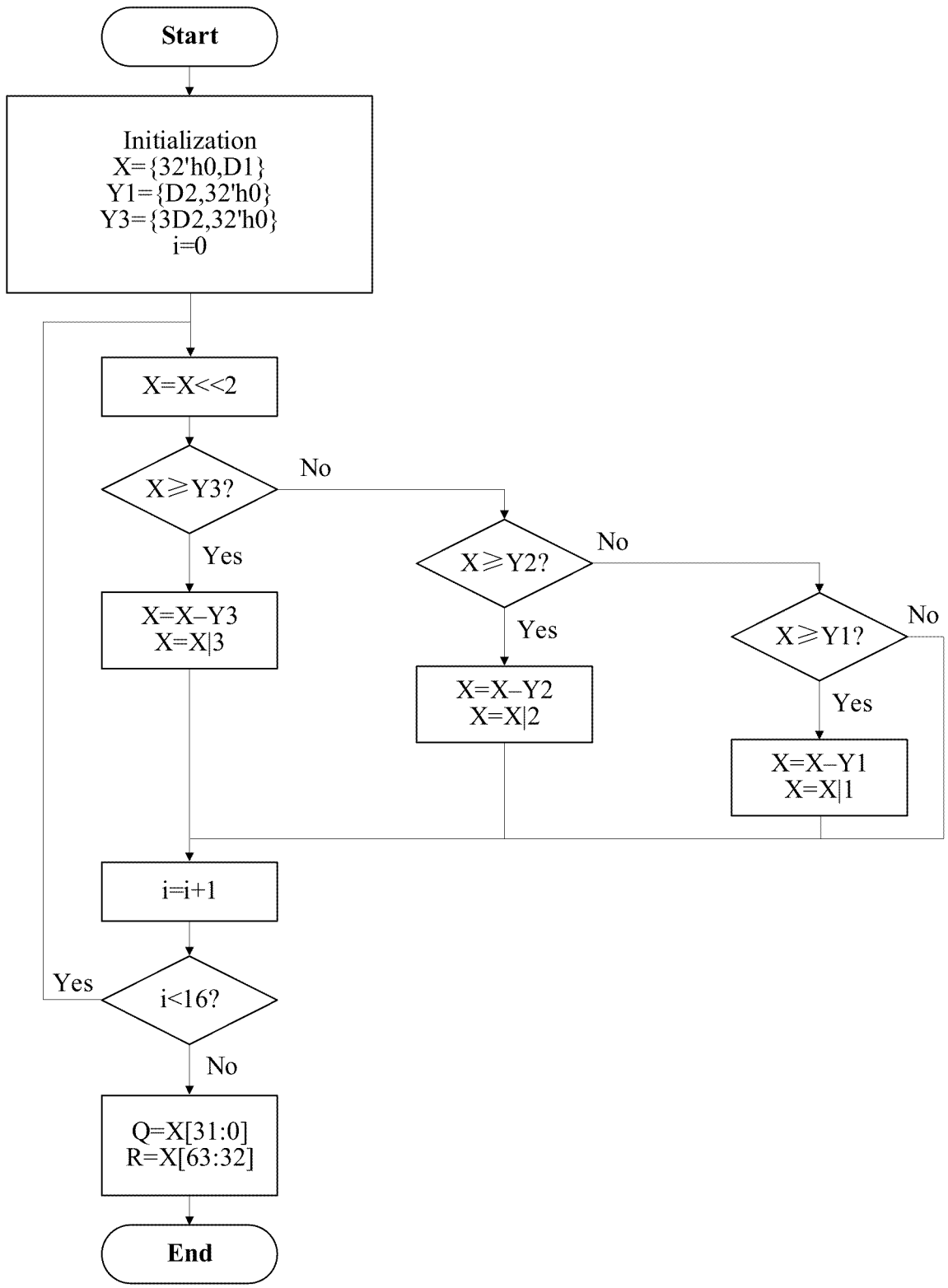
FIG. 9 shows a schematic diagram of a division operation flow in the divider of FIG. 8.

In a first embodiment, as shown in FIG. 8, the divider may include the first-stage shift circuit 110$a$, the first-stage selection circuit 120$a$, and the first-stage operational circuit 130$a$, and the divider may be used for implementing the division operation flow shown in FIG. 9.

The first preset bit number B1 of the dividend D1 and the third preset bit number B3 of the divisor D2 may be equal and both be 32. The initial first operand X={32'h0,D1} may be obtained by adding 32 zeros on the high-bit side of the dividend D1, and the third operand Y1={D2,32'h0} may be obtained by adding 32 zeros on the low-bit side of the divisor D2. In each cycle operation, the second preset bit number B2 by which the first-stage shift circuit 110$a$ shifts the first operand X to left may be 2, and accordingly, the preset cycle count in the divider is calculated to be 16, that is, the quotient Q and the remainder R are obtained by performing a total of 16 cycle operations. The first-stage shift circuit 110$a$ herein may include one or more shifters. According to the second preset bit number B2=2, it can be learned that in each cycle operation, the first operand X and three multiple of the third operand Y3, the first operand X and two multiple of the third operand Y2, and the first operand X and the third operand Y1 may need to be compared. For a purpose of simplifying the circuit structure of the divider, three multiple of the third operand Y3 may be calculated in advance during the initialization or preprocessing procedure, and two multiple of the third operand Y2 may be easily obtained by shifting the third operand Y1 to left by one bit. In each cycle operation, X may be compared with Y3 first, in a case in which X≥Y3, the difference (X−Y3) between X and Y3 may be calculated, then the OR operation result ((X−Y3)|3) of the difference and the multiple 3 may be calculated, and the OR operation result may be taken as the fifth operand; in a case in which X<Y3, X may be continued to be compared with Y2, in a case in which X≥Y2, the difference (X−Y2) between X and Y2 may be calculated, then the OR operation result ((X−Y2)|2) of the difference and the multiple 2 may be calculated, and the OR operation result may be taken as the fifth operand; in a case in which X<Y2, X is continued to be compared with Y1, in a case in which X≥Y1, the difference (X−Y1) between X and Y1 may be calculated, then the OR operation result ((X−Y1)|1) of the difference and the multiple 1 may be calculated, and the OR operation result is taken as the fifth operand; in a case in which X<Y1, the original first operand X is taken as the fifth operand. The first-stage selection circuit 120$a$ and the first-stage operational circuit 130$a$ of the divider may be used for implementing the process of determining the fifth operand described above. Then, the cycle count i is incremented by 1, and the current cycle count is compared with the preset cycle count, if the current cycle count is less than the preset cycle count (i<16), then the fifth operand as the updated first operand is returned to the first-stage shift circuit 110$a$ to enter the next cycle; otherwise, the quotient Q and the remainder R may be obtained according to the fifth operand, with the lower 32 bits of the fifth operand being the quotient Q and the higher 32 bits being the remainder R.

In a specific embodiment shown in FIG. 8, the divider may include a preprocessing circuit for performing the preprocessing or initializing operation on the dividend, the divisor, and the like. For example, as shown in FIG. 8, the preprocessing circuit may include the first register 141. The output terminal of the first register 141 may be connected to the input terminal of the initial-stage shift circuit (which is the first-stage shift circuit 110$a$ in FIG. 8) of the at least one shift circuit in the divider, and the first register 141 may be configured to temporarily store the operand (i.e., the first operand X) to be input into the initial-stage shift circuit.

In some embodiments, as shown in FIG. 8, the preprocessing circuit may include the second selector 142. The output terminal of the second selector 142 may be connected to the input terminal of the first register 141, and the second selector 142 may be configured to select the operand to enter the next cycle operation from the operand generated from the dividend and the operand returned by the last-stage operational circuit of the at least one operational circuit. In the specific embodiment in FIG. 8, in the first cycle operation of the divider, the second selector 142 selects the dividend D1, thereby generating the first operand; while in the non-first cycle operation of the divider, the second selector 142 selects the fifth operand returned by the first-stage operational circuit 130$a$ as the updated first operand. The second selector 142 may be formed by a variety of circuits, such as the multiplexer (MUX), the AO22 module, the AO222 module or the like.

In some embodiments, as shown in FIG. 8, the preprocessing circuit may include the second register 143. The output terminal of the second register 143 may be at least connected to one input terminal of one selection circuit (which is the first-stage selection circuit 120$a$ in FIG. 8), and the second register 143 may be configured to temporarily store the operand to be input into the selection circuit (which is the third operand generated from the divisor D2 in FIG. 8).

In some embodiments, the preprocessing circuit may include one or more multiple calculation circuits. Each multiple calculation circuit may be respectively configured to calculate the corresponding preset multiple of the operand. By calculating in advance at least one preset multiple of the operand, it can be effectively avoided that the preset multiple of the operand is repeatedly calculated in each cycle operation, thereby helping improve the operation efficiency.

In some embodiments, the multiple calculation circuit may include the even multiple calculation circuit, and the even multiple calculation circuit may include a first shifter. The first shifter may be configured to shift an intermediate operand to left by one bit to generate an even multiple of an initial operand, wherein the intermediate operand is an integer multiple of the initial operand.

In the first specific embodiment shown in FIG. 8, the even multiple calculation circuit may include the two-multiple calculation circuit. The two-multiple calculation circuit includes a first shifter 144, and the first shifter 144 may be configured to shift the third operand Y1 to left by one bit to generate two multiple of the third operand (i.e., Y2=2Y1). Further, the output terminal of the first shifter 144 may be connected to one input terminal of the first-stage selection circuit 120$a$, so as to transfer Y2 to the first-stage selection circuit 120$a$.

Figure 15:
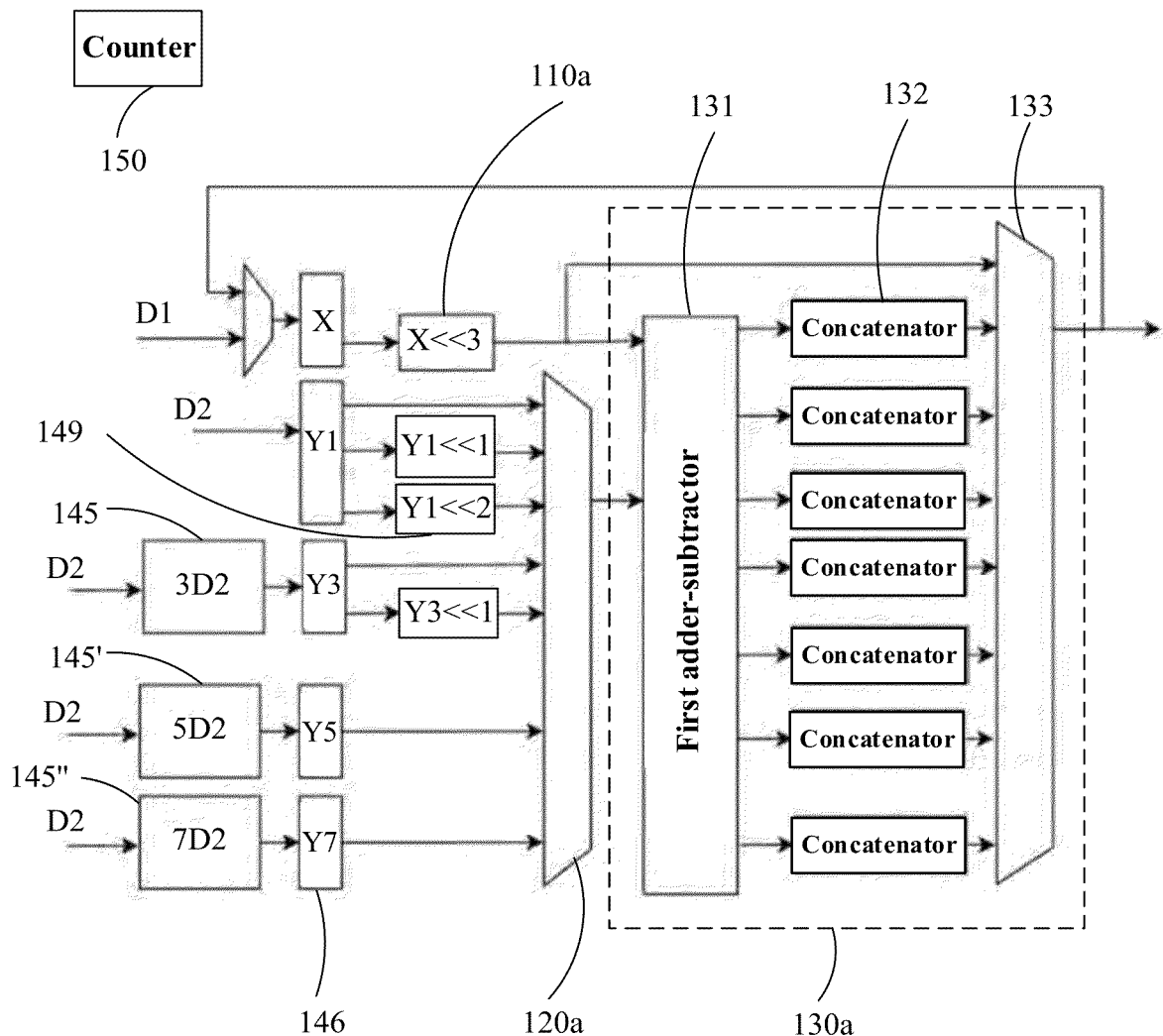
FIG. 15 shows a circuit structural schematic diagram of a divider in a fifth specific embodiment of the present disclosure.

In a fifth specific embodiment shown in FIG. 15, the even multiple calculation circuit may include two two-multiple calculation circuits, to respectively shift the third operand Y1 to left by one bit to generate two multiple of the third operand (i.e., Y2=2Y1), and to shift three multiple of the third operand Y3 to left by one bit to generate six multiple of the third operand (i.e., Y6=2Y3). In addition, the even multiple calculation circuit may further include the four-multiple calculation circuit, and the four-multiple calculation circuit includes the third shifter 149. The third shifter 149 may be configured to shift the third operand Y1 to left by two bits to generate four multiple of the third operand (i.e., Y4=4Y1). The third shifter 149 may be formed by two first shifters 144, for example. It may be understood that as required, more first shifters may be further disposed to form the eight-multiple calculation circuit, the sixteen-multiple calculation circuit, and the like, which is not limited herein.

In some embodiments, the multiple calculation circuit may further include the odd multiple calculation circuit, and the odd multiple calculation circuit may include a second shifter and a second adder-subtractor. The second shifter may be configured to shift an intermediate operand to left by one bit to generate two multiple of the intermediate operand, and the second adder-subtractor may be configured to add two multiple of the intermediate operand and an initial operand to generate an odd multiple of the initial operand, wherein the intermediate operand is an integer multiple of the initial operand.

In the first specific embodiment shown in FIG. 8, the odd multiple calculation circuit may include the three-multiple calculation circuit 145, and the three-multiple calculation circuit 145 may include a second shifter and a second adder-subtractor. The second shifter may be configured to shift the divisor to left by one bit to generate two multiple of the divisor, and the second adder-subtractor may be configured to add two multiple of the divisor and the divisor to generate three multiple of the divisor (i.e., $3D2=D2+D2\ll1$). However, it may be understood that the three-multiple calculation circuit 145 may alternatively perform the calculation based on the third operand generated from the divisor, to obtain three multiple of the third operand (i.e., $Y3=Y1+Y1\ll1$), which is not limited herein.

In the fifth specific embodiment shown in FIG. 15, the odd multiple calculation circuit may further include the five-multiple calculation circuit 145' and the seven-multiple calculation circuit 145". The five-multiple calculation circuit 145' may include a second shifter and a second adder-subtractor. The second shifter may be configured to shift two multiple of the divisor to left by one bit to generate four multiple of the divisor, and the second adder-subtractor may be configured to add four multiple of the divisor and the divisor to generate five multiple of the divisor (i.e., $5D2=D2+2D2\ll1$). The seven-multiple calculation circuit 145" may include a second shifter and a second adder-subtractor. The second shifter may be configured to shift three multiple of the divisor to left by one bit to generate six multiple of the divisor, and the second adder-subtractor may be configured to add six multiple of the divisor and the divisor to generate seven multiple of the divisor (i.e., $7D2=D2+3D2\ll1$). Likewise, as required, more odd multiple calculation circuits may be disposed, to calculate corresponding odd multiples of the operand in advance. In addition, it may be understood that the odd multiple calculation circuit may alternatively perform the calculation based on the third operand generated from the divisor, to obtain an odd multiple of the third operand, which is not limited herein.

In some other embodiments, an odd multiple calculation circuit may alternatively share an adder-subtractor with one operational circuit in the divider, to further simplify the circuit. In particular, the odd multiple calculation circuit may include a second adder-subtractor, a third selector, and a fourth selector. The second adder-subtractor is the same adder-subtractor as the first adder-subtractor of one operational circuit, and the output terminal of the first adder-subtractor is connected to the input terminal of the corresponding third register. The first input terminal of the third selector may be configured to receive two multiple of the intermediate operand, the second input terminal of the third selector may be connected to the output terminal of one shift circuit that is at the same stage as the operational circuit described above, and the output terminal of the third selector may be connected to the first input terminal of the first adder-subtractor described above. The intermediate operand herein is an integer multiple of the initial operand. The first input terminal of the fourth selector may be connected to the output terminal of one selection circuit that is at the same stage as the operational circuit described above, the second input terminal of the fourth selector may be configured to receive the initial operand, and the output terminal of the fourth selector may be connected to the second input terminal of the first adder-subtractor described above. In a case of calculating the preset multiple of the initial operand, the third selector may be configured to select two multiple of the intermediate operand, the fourth selector may be configured to select the initial operand, and the preset multiple of the initial operand output by the first adder-subtractor is returned to the corresponding third register; while in a case of performing the division operation in the divider, the third selector may be configured to select the operand output by the shift circuit described above, and the fourth selector may be configured to select the operand output by the selection circuit described above.

Figure 10:
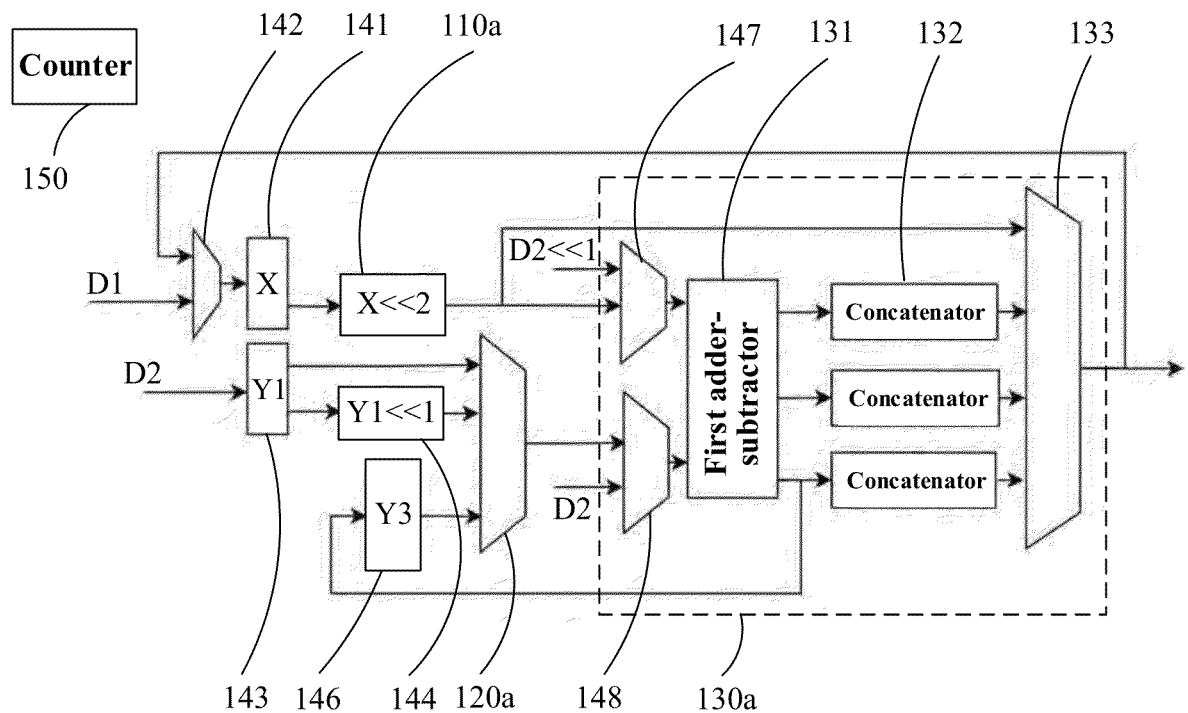
FIG. 10 shows a circuit structural schematic diagram of a divider according to a second specific embodiment of the present disclosure.

A second specific embodiment in FIG. 10 exemplarily illustrates a configuration manner of the odd multiple calculation circuit described above. In addition, other circuit components in the divider of FIG. 10 may be disposed in a manner similar to that in FIG. 8, which will not be described herein again. As shown in FIG. 10, the odd multiple calculation circuit may include the three-multiple calculation circuit. The three-multiple calculation circuit may include a second adder-subtractor, a third selector 147, and a fourth selector 148. The second adder-subtractor is the same adder-subtractor as the first adder-subtractor 131 of the first-stage operational circuit 130a. The output terminal of the first adder-subtractor 131 may be connected to the input terminal of the corresponding third register 146, to make the third register 146 temporarily store the calculated three multiple of the operand. The first input terminal of the third selector 147 may be configured to receive two multiple of the divisor, the second input terminal of the third selector 147 may be connected to the output terminal of the first-stage shift circuit 110a, and the output terminal of the third selector 147 may be connected to the first input terminal of the first adder-subtractor 131 described above. The first input terminal of the fourth selector 148 may be connected to the output terminal of the first-stage selection circuit 120a, the second input terminal of the fourth selector 148 may be configured to receive the divisor, and the output terminal of the fourth selector 148 may be connected to the second input terminal of the first adder-subtractor 131 described above. In a case of calculating three multiple of the divisor, the third selector 147 may be configured to select two multiple of the divisor, the fourth selector 148 may be configured to select the divisor, and the first adder-subtractor returns the calculated three multiple of the divisor to the third register 146; while in a case of performing the division operation, the third selector 147 may be configured to select the second operand output by the first-stage shift circuit 110a, the fourth selector 148 may be configured to select the fourth operand output by the first-stage selection circuit 120a, and the first adder-subtractor may calculate the difference from subtracting the fourth operand from the second operand, and transfer the difference to the subsequent circuit component for performing the division operation. It may be understood that in some other embodiments, in a case in which the divider includes a plurality of stages of operational circuits and thus includes a plurality of first adder-subtractors, the second adder-subtractor may be alternatively implemented by a first adder-subtractor in another stage of operational circuit as required, and the connection manner among related components in the circuit are adjusted accordingly according to the description above, which is not limited herein.

As mentioned above, the preprocessing circuit may include one or more third registers. The input terminal of each third register may be respectively connected to the output terminal of a corresponding multiple calculation circuit, and the output terminal of each third register may be respectively connected to the corresponding input terminal of one selection circuit at least. The third register may be configured to temporarily store the corresponding preset multiple of the operand to be input into the selection circuit.

In the first specific embodiment shown in FIG. 8, the preprocessing circuit may include one third register 146. The input terminal of the third register 146 may be connected to the output terminal of the three-multiple calculation circuit 145, and the output terminal of the third register 146 may be connected to one input terminal of the first-stage selection circuit 120a. The third register 146 may be configured to temporarily store three multiple of the third operand to be input into the first-stage selection circuit 120a. In the fifth specific embodiment shown in FIG. 15, the preprocessing circuit may include a plurality of third registers 146 for respectively, temporarily storing three multiple of the third operand, five multiple of the third operand, and seven multiple of the third operand to be input into the first-stage selection circuit 120a. It may be understood that as required, the divider may include more third registers 146, which is not limited herein.

In the first specific embodiment shown in FIG. 8, the selection circuit (for example, the first-stage selection circuit 120a) may include the multiplexer (MUX). The multiplexer may include a plurality of input terminals, the control terminal (not shown in the figure), and the output terminal. The multiplexer may be configured to select, in the effect of the control signal from the control terminal, one operand from a plurality of operands input from the plurality of input terminals, and to output the operand through the output terminal. Herein, the control signal may be generated according to the magnitude relationship between the first operand and the preset multiple of the third operand, so that an expected first preset multiple of the third operand is selected.

Figure 11A:
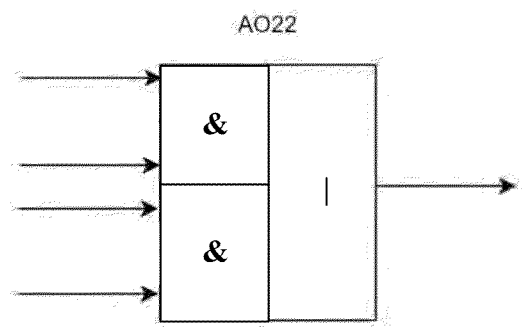
FIGS. 11 (a) and 11 (b) respectively show structural diagrams of an AO22 module and an AO222 module used as the selection circuits in specific examples of the present disclosure.
Figure 11B:
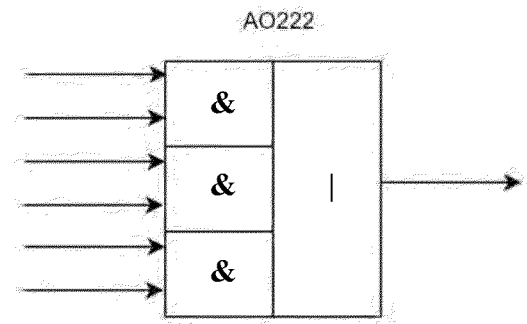

However, in some other embodiments, as shown in FIGS. 11 (a) and 11 (b), the AO22 module, the AO222 module, or the like may be alternatively used for replacing the multiplexer to form the selection circuit. For example, the AO22 module may be used for replacing a two-input multiplexer, the AO222 module may be used for replacing a three-input multiplexer, and so on. In particular, the selection circuit such as the AO22 module, the AO222 module, or the like may logically include a plurality of AND (&) operation units and one OR (|) operation unit. The plurality of AND operation units are disposed in parallel, and the output terminal of each AND operation unit is connected to an input terminal of the OR operation unit. Two input terminals of each of the plurality of AND operation units may be configured to receive the corresponding operand and the control signal respectively. The OR operation unit may be configured to perform the OR operation among the outputs from the plurality of AND operation units and to output the OR operation result, and the OR operation result is the expected preset multiple of the operand. Likewise, the control signal to be input into the AND operation unit may be generated according to the magnitude relationship between the first operand and the preset multiple of the third operand, so that the expected preset multiple of the third operand is selected. The AO22 module shown in FIG. 11 (a) may include two AND operation units, while the AO222 module shown in FIG. 11 (b) may include three AND operation units.

In the divider, there may be a plurality of setting manners of the operational circuit. For example, in some embodiments, the operational circuit may include the first adder-subtractor, a plurality of concatenators, and the first selector. The first adder-subtractor may be configured to calculate the difference between the higher preset bit portion of an operand as the minuend and the corresponding higher preset bit portion of an operand as the subtrahend. The input terminal of each concatenator may be connected to an output terminal of the first adder-subtractor, and the concatenator may be configured to generate the concatenated operand according to the difference from the first adder-subtractor and the corresponding preset multiple, wherein the high-bit portion of the concatenated operand is the difference, the low-bit portion of the concatenated operand is the corresponding preset multiple, and the middle-bit portion of the concatenated operand is the corresponding middle-bit portion of the minuend. Input terminals of the first selector may be connected to an output terminal of a corresponding shift circuit and an output terminal of each of the plurality of concatenators, and the first selector may be configured to select the corresponding operand from the operands that are from the shift circuit and the concatenators. By employing this setting manner, the adder-subtractor with the bit number of two multiple of the first preset bit number shown in FIG. 1 may be simplified to the adder-subtractor with the bit number of the first preset bit number, thereby significantly reducing the bit number required for the adder-subtractor, further reducing the chip area which may be occupied by the adder-subtractor, simplifying the circuit structure of the divider, and reducing the apparatus cost.

The operational circuit in the first specific embodiment of FIG. 8 employs the setting manner described above. In particular, as shown in FIG. 8, the first-stage operational circuit 130a may include the first adder-subtractor 131, a plurality of concatenators 132, and the first selector 133. The first adder-subtractor 131 may be configured to calculate the difference between the higher 32 bit portion of the second operand as the minuend and the higher 32 bit portion of the fourth operand as the subtrahend. The input terminal of each concatenator 132 may be connected to an output terminal of the first adder-subtractor 131, and the concatenator 132 may be configured to generate the concatenated operand according to the difference from the first adder-subtractor 131 and the corresponding preset multiple. For example, three concatenators 132 shown in FIG. 8 are respectively used to generate {X [63:2], 2b'01}, {X [63:2], 2b'10}, and {X [63:2], 2b'11} by concatenation, that is, to concatenate the higher 62 bits of the calculated difference and the preset multiple with two bits together. The input terminals of the first selector 133 may be connected to the output terminal of the first-stage shift circuit 110a and the output terminal of each of the plurality of concatenators 132. The first selector 133 may be configured to select the corresponding operand from the operands that are from the first-stage shift circuit 110a and the concatenators 132. It may be understood that the first selector 133 may be formed by the multiplexer, the AO222 module, or the like, and may select the expected operand in the effect of the control signal.

In some other embodiments, the operational circuit may include the first adder-subtractor, a plurality of OR gates, and the first selector. The first adder-subtractor may be configured to calculate the difference between the higher preset bit portion of an operand as the minuend and the corresponding higher preset bit portion of an operand as the subtrahend. The input terminal of each OR gate may be connected to an output terminal of the first adder-subtractor, and the OR gate may be configured to calculate the OR operation result between the difference from the first adder-subtractor and a corresponding preset multiple. The input terminals of the first selector may be connected to an output terminal of a corresponding shift circuit and an output terminal of each of the plurality of OR gates. The first selector may be configured to select the corresponding operand from the operand that is from the shift circuit and the OR operation results that are from the OR gates. In other words, the OR gate may be used for replacing the concatenator in the operational circuit. Since the OR gate is a basic logic circuit easy to be implemented, it also helps simplify the circuit structure and reduce the circuit cost.

Figure 12:
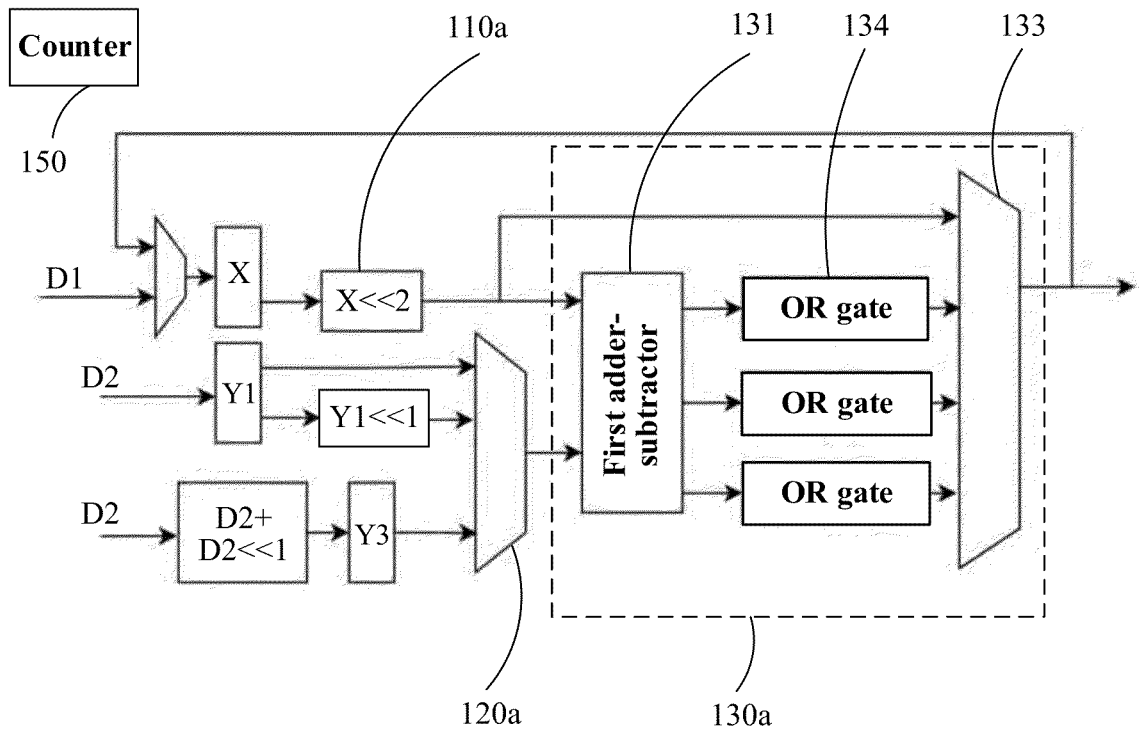
FIG. 12 shows a circuit structural schematic diagram of a divider in a third specific embodiment of the present disclosure.

A third specific embodiment of FIG. 12 exemplarily illustrates the configuration manner of the operational circuit described above. In addition, other components in the divider of FIG. 12 may be disposed in a manner similar to that in FIG. 8, which will not be described herein again. As shown in FIG. 12, the first-stage operational circuit 130a may include the first adder-subtractor 131, a plurality of OR gates 134, and the first selector 133. The first adder-subtractor 131 may be configured to calculate the difference between the higher 32 bit portion of the second operand as the minuend and the higher 32 bit portion of the fourth operand as the subtrahend. The input terminal of each OR gate 134 may be connected to an output terminal of the first adder-subtractor 131, and the OR gate 134 may be configured to calculate the OR operation result of the difference from the first adder-subtractor 131 and the corresponding preset multiple (note that the OR operation herein may be the bitwise OR operation). The input terminals of the first selector 133 may be connected to the output terminal of the first-stage shift circuit 110a and the output terminal of each of the plurality of OR gates 134, and the first selector 133 may be configured to select the corresponding operand from the operands that are from the first-stage shift circuit 110a and the OR gates 134.

In some embodiments, as shown in FIGS. 8, 10, 12, 13, and 15, the divider may further include the counter 150, which may be configured to record the number of cycle operations in the divider, so as to help determine whether to continue the cycle or to break out of the cycle. For example, the second selector 142 in the divider shown in FIG. 8 may be communicationally connected to the counter 150, and may determine whether to continue the next cycle operation according to the number of the cycle operations recorded in the counter 150.

The following table gives the value of each operand in each cycle operation in a specific division operation process that is performed by the corresponding divider based on the division operation flow shown in FIG. 9 (the values therein are represented in hexadecimal notation):

| i | D1 | D2 | X | Y1 | Q | R |
|---|------|------|--------|---------------|---|---|
| 0 (start) | 0x15c7 | 0x26 | 0x15c7 | 0x26_00000000 | | |
| 1 | | | 0x571c | 0x26_00000000 | | |
| 2 | | | 0x15c70 | 0x26_00000000 | | |
| 3 | | | 0x571c0 | 0x26_00000000 | | |

-continued

| i | D1 | D2 | X | Y1 | Q | R |
|---|----|----|---|----|---|---|
| 4 | | | 0x15c700 | 0x26_00000000 | | |
| 5 | | | 0x571c00 | 0x26_00000000 | | |
| 6 | | | 0x15c7000 | 0x26_00000000 | | |
| 7 | | | 0x571c000 | 0x26_00000000 | | |
| 8 | | | 0x15c70000 | 0x26_00000000 | | |
| 9 | | | 0x571c0000 | 0x26_00000000 | | |
| 10 | | | 0x1_5c700000 | 0x26_00000000 | | |
| 11 | | | 0x5_71c00000 | 0x26_00000000 | | |
| 12 | | | 0x15_c7000000 | 0x26_00000000 | | |
| 13 | | | 0xb_1c000002 | 0x26_00000000 | | |
| 14 | | | 0x6_70000009 | 0x26_00000000 | | |
| 15 | | | 0x19_c0000024 | 0x26_00000000 | | |
| 16 | | | 0x1b_00000092 | 0x26_00000000 | | |
| (end) | | | | | 0x92 | 0x1b |

Figure 13:
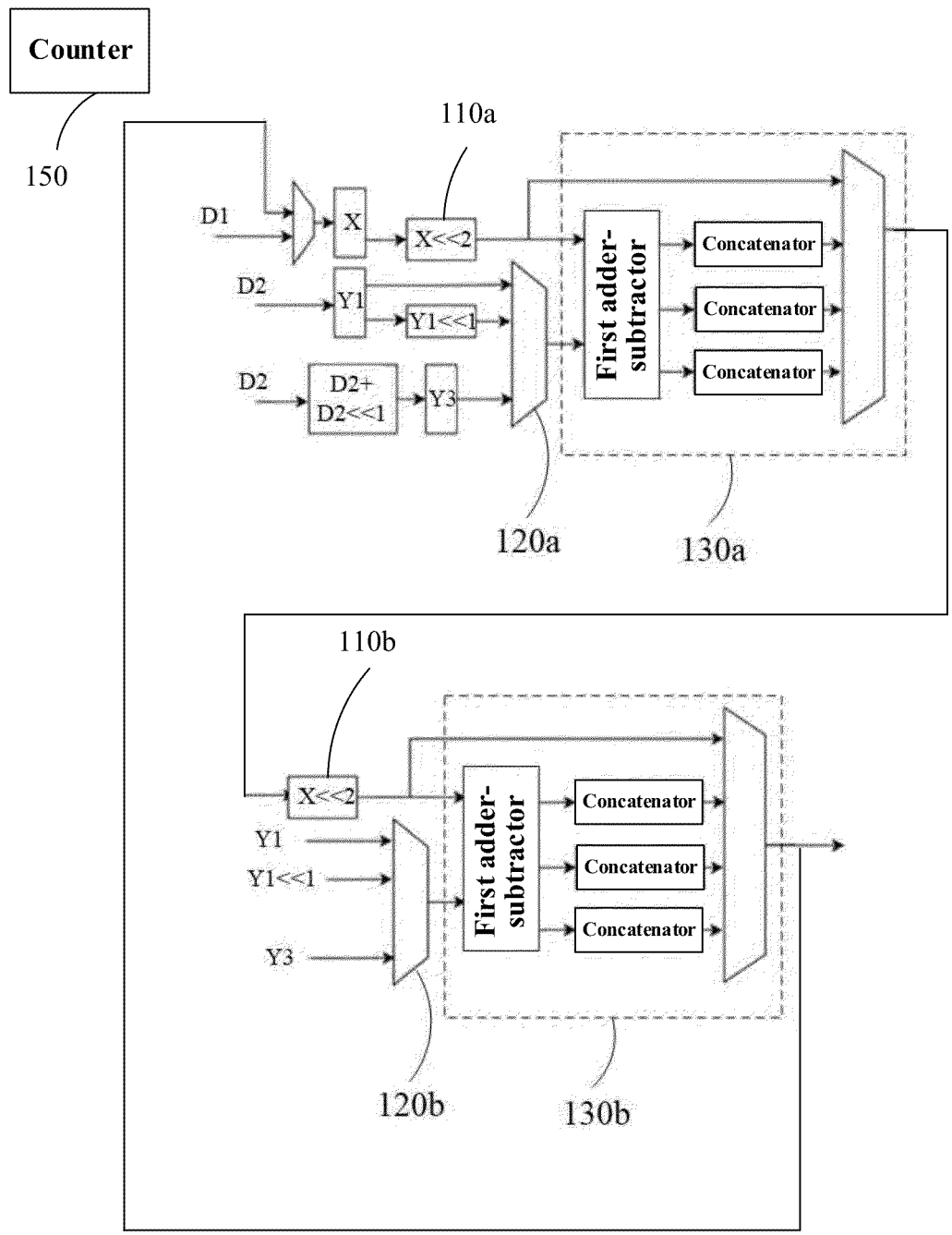
FIG. 13 shows a circuit structural schematic diagram of a divider in a fourth specific embodiment of the present disclosure.
Figure 14:
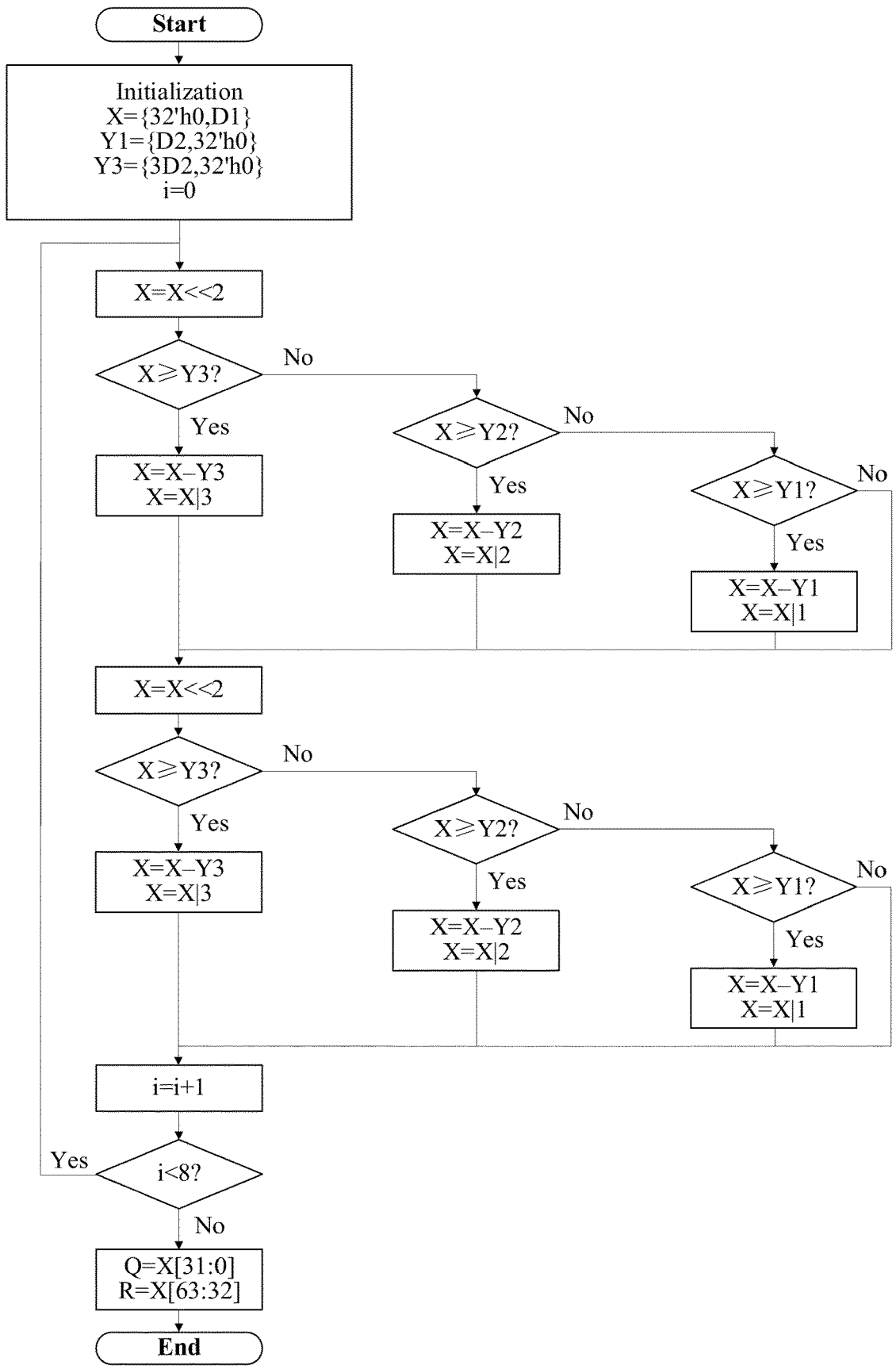
FIG. 14 shows a schematic diagram of a division operation flow in the divider of FIG. 13.

As described above about FIGS. 3 and 4, two shift operations may be alternatively performed in the single cycle operation of the divider, to further reduce the number of the cycle operations required. A fourth specific embodiment of FIG. 13 exemplarily shows the circuit structure of the divider. FIG. 14 describes the division operation flow in the divider of FIG. 13. As shown in FIG. 13, the divider may include the first-stage shift circuit 110a, the first-stage selection circuit 120a, the first-stage operational circuit 130a, the second-stage shift circuit 110b, the second-stage selection circuit 120b, and the second-stage operational circuit 130b, which are connected in the manner as shown above. As such, the fifth operand generated by the first-stage operational circuit 130a may be input into the second-stage shift circuit 110b to continue to be shifted to left by two bits for operation, so that a total preset cycle count can be reduced from 16 shown in FIGS. 9 to 8 shown in FIG. 14. In a case in which the clock period in a processor or calculation apparatus where the divider located is long, performing two or more left shifts in the single cycle may utilize the clock period more adequately and reduce the number of the cycles. In addition, in the specific embodiment shown in FIG. 13, the two stages of circuits respectively employ the similar configurations. However, it may be understood that as required, the two stages of circuits may be alternatively set employing different configurations.

Figure 16:
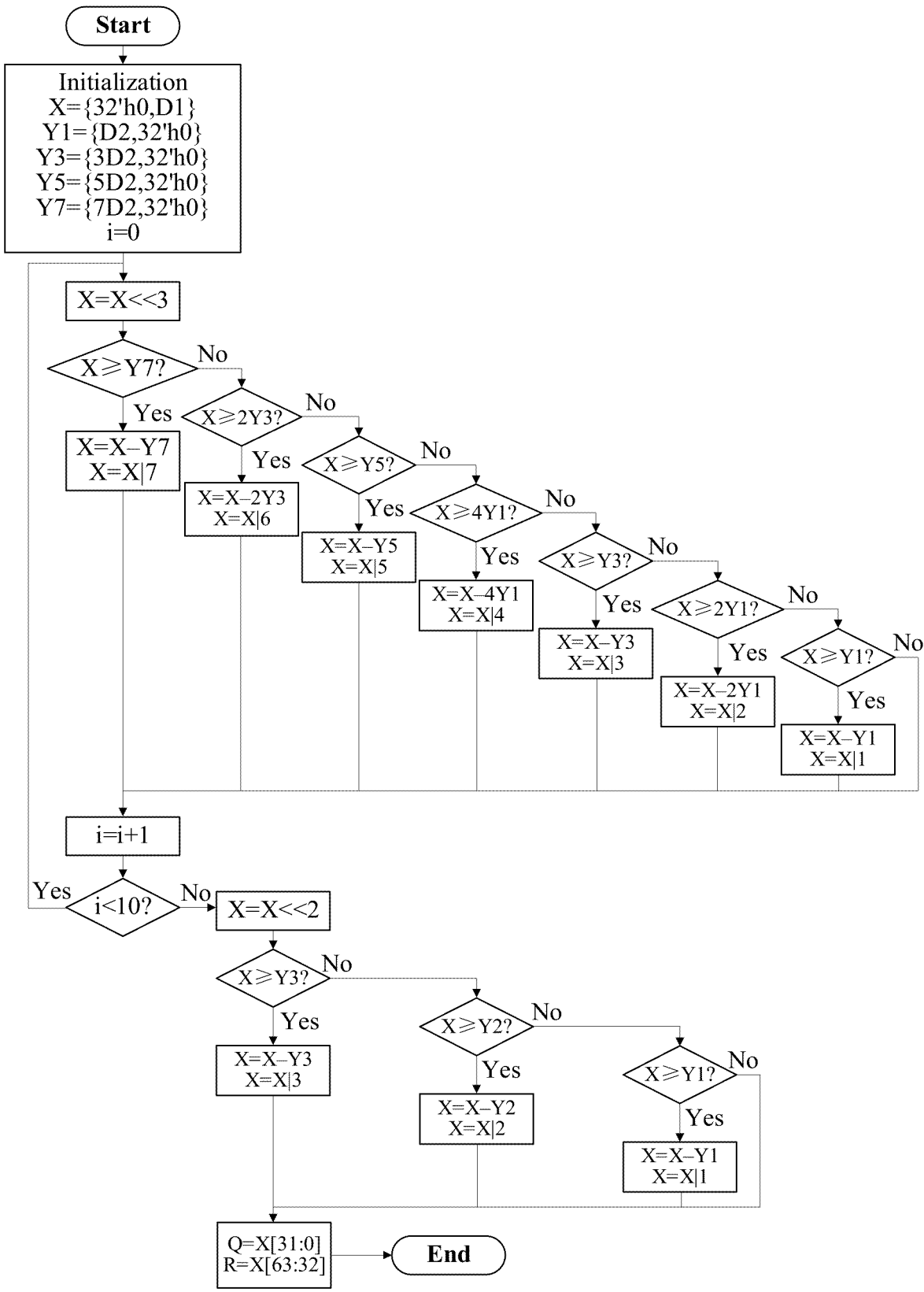
FIG. 16 shows a schematic diagram of a division operation flow in the divider of FIG. 15.

In the specific embodiments of FIGS. 8, 10, 12, and 13, each stage of shift circuit shifts the operand to left by two bits each time. However, the operand may be alternatively shifted to left by more bits, to reduce the number of the cycle operations required. The fifth specific embodiment shown in FIG. 15 provides the divider in which the shift circuit shifts the operand to left by three bits, and FIG. 16 shows the division operation flow performed in the divider of FIG. 15. Because the second preset bit number shifting to left is B2=3, one multiple of the third operand to seven multiple of the third operand may be provided to be selected by the first-stage selection circuit 120a. Accordingly, the number of the concatenators 132 (or the OR gates used for performing the OR operations) required in the first-stage operational circuit 130a is increased to seven, and the first selector 133 is accordingly changed to be the one-out-of-eight selector. In addition, since a total number of bits need to be shifted in the division operation is 32, which is not divisible by the second preset bit number of 3, as shown in FIG. 16, shifting to left by only two bits may be performed in the last cycle, and in this case, the second operand resulting from shifting may be compared with only three multiple of the third operand, two multiple of the third operand, and one multiple of the third operand, and the expected multiple of the third operand may be selected therefrom. After the first-stage operational circuit 130a performs the operation, the fifth operand is obtained, the quotient may be extracted from the lower 32 bits of the fifth operand, and the remainder may be extracted from the higher 32 bits of the fifth operand.

In the divider of the present disclosure, by increasing the number of bits by which the operand generated from the dividend is shifted to left in at least one cycle operation, a total number of the cycles required may be effectively reduced, thereby reducing the drawback of a long delay that is caused by a plurality of cycles. For example, compared with shifting by only one bit, shifting by two bits in each cycle may reduce the delay by half. As the number of bits shifting in each cycle increases further, the delay can be further reduced. In addition, in some dividers of the present disclosure, by converting the addition and subtraction operations in the process of the division operation into the addition and subtraction, and the concatenation operations of a part of the bits, or into the addition and subtraction, and the OR operations of a part of the bits, the bit number required for the adder-subtractor can be effectively reduced, thereby helping simplify the circuit structure, reduce the chip area need to be occupied, and reduce the divider cost.

Figure 17:
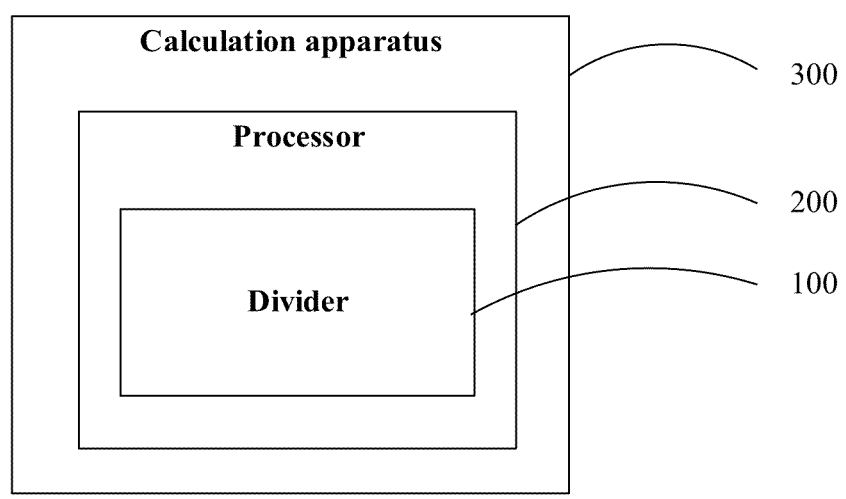
FIG. 17 shows a block diagram of a calculation apparatus according to an exemplary embodiment of the present disclosure.

This disclosure further provides a processor. As shown in FIG. 17, the processor 200 may include the divider 100 as described above. For example, the processor 200 may be a variety of processors such as a neural-network processor, a central processor, a coprocessor, a digital signal processor, a dedicated instruction processor, or the like.

This disclosure further provides a calculation apparatus. As shown in FIG. 17, the calculation apparatus 300 may include the divider 100 as described above or the processor 200 as described above. Examples of the calculation apparatus 300 may include but are not limited to a consumer electronic product, a component of a consumer electronic product, an electronic test device, and cellular communications infrastructure such as a base station. Examples of the calculation apparatus 300 may include but are not limited to a mobile phone such as a smartphone, a wearable calculation apparatus such as a smartwatch or a headset, a telephone, a television, a computer monitor, a computer, a modem, a handheld computer, a laptop computer, a tablet computer, a personal digital assistant (PDA), a microwave oven, a refrigerator, an in-vehicle electronic system such as an automotive electronic system, a stereo system, a DVD player, a CD player, a digital music player such as an MP3 player, a radio receiver, a camcorder, a camera such as a digital camera, a portable memory chip, a washing machine, a dryer, a washing machine/dryer, a peripheral device, and a clock. Moreover, the calculation apparatus 300 may include an incomplete product.

The terms "left", "right", "front", "rear", "top", "bottom", "above", "under", "upper", "lower", and the like in the specification and the claims, if present, are used for a descriptive purpose and are not necessarily used for describing an unchanged relative position. It is to be understood that the words used in such a way are interchangeable in proper circumstances so that the embodiments of the present disclosure described herein, for example, can be operated in other orientations that are different from those shown herein or those described otherwise. For example, when the device in the accompanying drawings is turned upside down, a feature originally described as being "above" another feature may be described as being "under" another feature in this case. The device may alternatively be oriented in other manners (rotated 90 degrees or in other orientations). In this case, a relative spatial relationship will be interpreted correspondingly.

In the specification and the claims, when an element is referred to as being "above" another element, "attached" to another element, "connected" to another element, "coupled" to another element, "in contact" with another element, or the like, the element may be directly above the another element, directly attached to the another element, directly connected to the another element, directly coupled to the another element, or directly in contact with the another element; or one or more intermediate elements may exist. In contrast, when an element is referred to as being "directly above" another element, "directly attached" to another element, "directly connected" to another element, "directly coupled" to another element, or "in direct contact" with another element, no intermediate element exists. In the specification and the claims, a feature being arranged as being "adjacent" to another feature may mean that the feature has a part that overlaps with the adjacent feature or that is located above or under the adjacent feature.

As used herein, the term "exemplary" means "used as an example, instance, or illustration", and not as a "model" to be accurately copied. Any implementation exemplarily described herein is not necessarily to be construed as preferred or advantageous over other implementations. In addition, the present disclosure is not limited by any stated or implied theory provided in the technical field, background, summary, or detailed description.

As used herein, the term "substantially" means that any minor variation caused by a defect of a design or manufacturing, a tolerance of a device or an element, environmental impact, and/or other factors is included. The term "substantially" also allows for a difference from a perfect or ideal situation caused by parasitic effect, noise, and other practical consideration factors that may exist in practical implementation.

In addition, terms like "first" and "second" may also be used herein for a reference purpose only, and therefore are not intended for a limitation. For example, the terms "first", "second" and other such numerical terms relating to a structure or an element do not imply a sequence or an order unless the context clearly indicates otherwise.

It is to be further understood that the term "comprise/include", when used herein, specifies the presence of stated features, integers, steps, operations, units, and/or components, but do not preclude the presence or addition of one or more other features, integers, steps, operations, units, and/or components, and/or combinations thereof.

In addition, when used in this application, the terms "herein", "foregoing", "following", "hereinafter", and "hereinabove" and terms of similar meanings shall refer to the entirety of this application but not any specific part of this application. Moreover, unless otherwise stated clearly or interpreted in other manners in the context used, conditional language such as "may", "can", "for example", and "such as" used herein are usually intended to indicate that some embodiments include certain features, elements, and/or states but other embodiments do not.

Therefore, such conditional language are usually not intended to imply that features, elements, and/or states are required in any manner in one or more embodiments, or imply whether these features, elements, and/or states are included, or imply that these features, elements, and/or states are implemented in any specific embodiment.

In the present disclosure, the term "provide" is used broadly for covering all manners of obtaining an object.

Therefore, "providing an object" includes but is not limited to "purchasing", "preparing/manufacturing", "arranging/setting", "installing/assembling", and/or "ordering" the object, etc.

As used herein, the term "and/or" includes any and all combinations of one or more of associated listed items. The terms used herein are merely for the purpose of describing specific embodiments but not intended to limit the present disclosure. The singular forms "a", "an", and "the" as used herein are intended to include plural forms as well, unless otherwise clearly stated in the context.

A person skilled in the art should appreciate that the boundaries between the operations as described above are merely illustrative. A plurality of operations may be combined into a single operation, a single operation may be distributed in an additional operation, and operations may be performed at least partially overlapping in time. In addition, alternative embodiments may include a plurality of instances of a specific operation, and an operation order may be changed in various other embodiments. Other modifications, changes, and replacements, however, are also possible. Aspects and elements of all embodiments disclosed above may be combined in any manner and/or combined with aspects or elements of other embodiments to provide a plurality of additional embodiments. Therefore, the specification and the accompanying drawings are to be regarded as illustrative rather than restrictive. In practice, the novel device, method, and system described herein may be embodied in various other forms. Moreover, various omissions, replacements, and changes may be made to the forms of the method and the system described herein without departing from the spirit of the present disclosure. For example, although blocks are shown in a given arrangement, in alternative embodiments, similar functions with different components and/or circuit topologies may be performed, and some blocks may be removed, moved, added, subdivided, combined, and/or modified. Each of these blocks may be implemented in various different manners.

Each embodiment of the present disclosure may be described in a progressive manner. For same or similar parts between each embodiment, can refer to each other. Descriptions of each embodiment focus on a difference from other embodiments. In the present disclosure, descriptions with reference to the term "an embodiment", "some embodiments", "an example", "a specific example", "some examples", or the like mean that specific features, structures, materials, or characteristics described in conjunction with the embodiment or example are included in at least one embodiment or example of the present disclosure. In the present disclosure, exemplary descriptions of the foregoing terms do not necessarily refer to a same embodiment or example. In addition, the described specific features, structures, materials, or characteristics may be combined in proper manners in any one or more embodiments or examples.

Although some specific embodiments of the present disclosure are described in detail by examples, a person skilled in the art is to understand that the foregoing examples are merely used for description, but not for limiting the scope of the present disclosure. Each embodiment disclosed herein may be combined in any combination without departing from the spirit and scope of the present disclosure. A person skilled in the art is to further understand that various modifications may be made to the embodiments without departing from the scope and spirit of the present disclosure. The scope of the present disclosure is defined by the appended claims.

What is claimed is:

1. A divider for performing a division operation between a dividend and a divisor, comprising:
   at least one shift circuit comprising a first-stage shift circuit, wherein the first-stage shift circuit is configured to shift a received first operand to left to generate a second operand, and the first operand initially input into the divider is generated from the dividend;
   at least one selection circuit comprising a first-stage selection circuit, wherein the first-stage selection circuit is configured to select a first preset multiple of a third operand from preset multiples of the third operand, the first preset multiple of the third operand is as a fourth operand, the third operand is generated from the divisor, the second operand is greater than or equal to the first preset multiple of the third operand, the second operand is less than a second preset multiple of the third operand, and the second preset multiple is greater than the first preset multiple by one; and
   at least one operational circuit comprising a first-stage operational circuit, wherein a first input terminal of the first-stage operational circuit is connected to an output terminal of the first-stage shift circuit, a second input terminal of the first-stage operational circuit is connected to an output terminal of the first-stage selection circuit, and the first-stage operational circuit is configured to calculate an OR operation result of a difference and the first preset multiple, the difference is the difference from subtracting the fourth operand from the second operand, and the OR operation result is as a fifth operand.

2. The divider according to claim 1, wherein the at least one shift circuit further comprises a second-stage shift circuit, an input terminal of the second-stage shift circuit is connected to an output terminal of the first-stage operational circuit, and the second-stage shift circuit is configured to shift the received fifth operand to left to generate a sixth operand;
   the at least one selection circuit further comprises a second-stage selection circuit, the second-stage selection circuit is configured to select a third preset multiple of a seventh operand from preset multiples of the seventh operand, wherein the third preset multiple of the seventh operand is as an eighth operand, the seventh operand is generated from the divisor, the sixth operand is greater than or equal to the third preset multiple of the seventh operand, the sixth operand is less than a fourth preset multiple of the seventh operand, and the fourth preset multiple is greater than the third preset multiple by one; and
   the at least one operational circuit further comprises a second-stage operational circuit, a first input terminal of the second-stage operational circuit is connected to an output terminal of the second-stage shift circuit, a second input terminal of the second-stage operational circuit is connected to an output terminal of the second-stage selection circuit, and the second-stage operational circuit is configured to calculate an OR operation result of a difference and the third preset multiple, the difference is the difference subtracting the eighth operand from the sixth operand, and the OR operation result is as a ninth operand.

3. The divider according to claim 2, wherein a number of bits by which the second operand shifts to left relative to the first operand is equal to a number of bits by which the sixth operand shifts to left relative to the fifth operand;

the third operand is equal to the seventh operand; and the preset multiples of the third operand received by the first-stage selection circuit are respectively equal to the corresponding preset multiples of the seventh operand received by the second-stage selection circuit.

4. The divider according to claim 1, wherein an output terminal of a last-stage operational circuit of the at least one operational circuit is connected to an input terminal of an initial-stage shift circuit of the at least one shift circuit, and the last-stage operational circuit is configured to return its calculated OR operation result as an updated operand to the initial-stage shift circuit, so as to enter a next cycle operation in the divider.

5. The divider according to claim 1, wherein the selection circuit comprises a multiplexer, the multiplexer comprises a plurality of input terminals, a control terminal, and an output terminal, and the multiplexer is configured to select, in an effect of a control signal at the control terminal, one operand from a plurality of operands input from the plurality of input terminals, to be output through the output terminal.

6. The divider according to claim 1, wherein the selection circuit comprises a plurality of AND operation units and one OR operation unit, the plurality of AND operation units are disposed in parallel, an output terminal of each AND operation unit is connected to an input terminal of the OR operation unit, two input terminals of each of the plurality of AND operation units are respectively configured to receive a corresponding operand and a control signal, and the OR operation unit is configured to perform an OR operation among a plurality of AND operation results of the operands and the control signals from the plurality of AND operation units, and to output an OR operation result.

7. The divider according to claim 1, wherein the operational circuit comprises:

a first adder-subtractor, wherein the first adder-subtractor is configured to calculate a difference between a higher preset bit portion of an operand as a minuend and a corresponding higher preset bit portion of an operand as a subtrahend;

a plurality of concatenators, wherein an input terminal of each of the plurality of concatenators is connected to an output terminal of the first adder-subtractor, and the concatenator is configured to generate a concatenated operand according to the difference from the first adder-subtractor and a corresponding preset multiple, wherein a high-bit portion of the concatenated operand is the difference, a low-bit portion of the concatenated operand is the corresponding preset multiple, and a middle-bit portion of the concatenated operand is a corresponding middle-bit portion of the minuend; and a first selector, wherein input terminals of the first selector are connected to an output terminal of a corresponding shift circuit and an output terminal of each of the plurality of concatenators, and the first selector is configured to select a corresponding operand from operands that are from the shift circuit and the concatenators.

8. The divider according to claim 1, wherein the operational circuit comprises:

a first adder-subtractor, wherein the first adder-subtractor is configured to calculate a difference between a higher preset bit portion of an operand as a minuend and a corresponding higher preset bit portion of an operand as a subtrahend;

a plurality of OR gates, wherein an input terminal of each of the plurality of OR gates is connected to an output terminal of the first adder-subtractor, and the OR gate is configured to calculate an OR operation result of between the difference from the first adder-subtractor and a corresponding preset multiple; and a first selector, wherein input terminals of the first selector are connected to an output terminal of a corresponding shift circuit and an output terminal of each of the plurality of OR gates, and the first selector is configured to select a corresponding operand from an operand that is from the shift circuit and OR operation results that are from the OR gates.

9. The divider according to claim 1, further comprising a preprocessing circuit, wherein the preprocessing circuit comprises at least one of:

a first register, wherein an output terminal of the first register is connected to an input terminal of an initial-stage shift circuit of the at least one shift circuit, and the first register is configured to temporarily store an operand to be input into the initial-stage shift circuit;

a second selector, wherein an output terminal of the second selector is connected to an input terminal of the first register, and the second selector is configured to select an operand to enter a next cycle operation from the operand generated from the dividend and an operand returned by a last-stage operational circuit of the at least one operational circuit;

a second register, wherein an output terminal of the second register is at least connected to one input terminal of one selection circuit, and the second register is configured to temporarily store an operand to be input into the selection circuit;

one or more multiple calculation circuits, wherein each of the one or more multiple calculation circuits is respectively configured to calculate a corresponding preset multiple of an operand; or one or more third registers, wherein an input terminal of each of the one or more third registers is connected to an output terminal of a corresponding multiple calculation circuit, an output terminal of each third register is at least connected to a corresponding input terminal of one selection circuit respectively, and the third register is configured to temporarily store the corresponding preset multiple of the operand to be input into the selection circuit.

10. The divider according to claim 9, wherein the multiple calculation circuit comprises an even multiple calculation circuit, the even multiple calculation circuit comprises a first shifter, the first shifter is configured to shift an intermediate operand to left by one bit to generate an even multiple of an initial operand, wherein the intermediate operand is an integer multiple of the initial operand.

11. The divider according to claim 9, wherein the multiple calculation circuit comprises an odd multiple calculation circuit, the odd multiple calculation circuit comprises a second shifter and a second adder-subtractor, the second shifter is configured to shift an intermediate operand to left by one bit to generate two multiple of the intermediate operand, the second adder-subtractor is configured to add two multiple of the intermediate operand and an initial operand to generate an odd multiple of the initial operand, wherein the intermediate operand is an integer multiple of the initial operand.

12. The divider according to claim 9, wherein the multiple calculation circuit comprises an odd multiple calculation circuit, and the odd multiple calculation circuit comprises:

a second adder-subtractor, wherein the second adder-subtractor is a same adder-subtractor as a first adder-subtractor in one of the at least one operational circuit, and an output terminal of the first adder-subtractor is connected to an input terminal of a corresponding third register;

a third selector, wherein a first input terminal of the third selector is configured to receive two multiple of an intermediate operand, a second input terminal of the third selector is connected to an output terminal of one shift circuit that is at a same stage as the operational circuit, an output terminal of the third selector is connected to a first input terminal of the first adder-subtractor, and the intermediate operand is an integer multiple of an initial operand; and a fourth selector, wherein a first input terminal of the fourth selector is connected to an output terminal of one selection circuit that is at the same stage as the operational circuit, a second input terminal of the fourth selector is configured to receive the initial operand, and an output terminal of the fourth selector is connected to a second input terminal of the first adder-subtractor;

wherein in a case of calculating a preset multiple of the initial operand, the third selector is configured to select two multiple of the intermediate operand, the fourth selector is configured to select the initial operand, and the preset multiple of the initial operand output by the first adder-subtractor is returned to the third register; and in a case of performing a division operation in the divider, the third selector is configured to select an operand output by the shift circuit, and the fourth selector is configured to select an operand output by the selection circuit.

13. The divider according to claim 1, further comprising:
a counter configured to record a number of cycle operations in the divider.

14. The divider according to claim 1, wherein the dividend has a first preset bit number B1, the divisor has a third preset bit number B3, the first operand initially input into the divider is generated by adding B3 zeros to the dividend on a high-bit side of the dividend, and the third operand is generated by adding B1 zeros to the divisor on a low-bit side of the divisor.

15. The divider according to claim 14, wherein in a case in which a remaining bit number Br and a second preset bit number B2 satisfy Br≥B2, the second operand is generated by shifting the first operand to left by the second preset bit number B2 of bits; or in a case in which the remaining bit number Br and the second preset bit number B2 satisfy Br<B2, the second operand is generated by shifting the first operand to left by the remaining bit number Br of bits, wherein the remaining bit number Br satisfies that Br=B3−N*B0, B0 is a total number of bits shifting to left by the at least one shift circuit in the non-last cycle operation of the divider, N is a number of cycles already performed in the divider, Br≥1, and B2>1.

16. The divider according to claim 15, wherein the divider is configured to perform a last cycle operation in a case in which Br≤B2.

17. The divider according to claim 15, wherein the preset multiples of the third operand comprise all integer multiples of the third operand in a range from one multiple of the third operand to M0 multiple of the third operand, wherein in a case in which Br≥B2, M0=2B2−1, or in a case in which Br<B2, M0=2Br−1.

18. A processor, comprising the divider according to claim 1.

19. The processor according to claim 18, wherein the processor comprises at least one of a neural-network processor, a central processor, a coprocessor, a digital signal processor, or a dedicated instruction processor.

20. A calculation apparatus, comprising the processor according to claim 18.

\* \* \* \* \*